(12) United States Patent
Sato et al.

(10) Patent No.: US 9,867,265 B2
(45) Date of Patent: Jan. 9, 2018

(54) DISCHARGE LAMP DRIVING DEVICE, PROJECTOR, AND DISCHARGE LAMP DRIVING METHOD

(71) Applicant: SEIKO EPSON CORPORATION, Tokyo (JP)

(72) Inventors: Shun Sato, Matsumoto (JP); Junichi Suzuki, Matsumoto (JP); Satoshi Kito, Chino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/168,634

(22) Filed: May 31, 2016

(65) Prior Publication Data
US 2016/0360600 A1    Dec. 8, 2016

(30) Foreign Application Priority Data

Jun. 4, 2015  (JP) ................................. 2015-113728
Jun. 4, 2015  (JP) ................................. 2015-113729

(51) Int. Cl.
*H05B 41/288* (2006.01)
*G03B 21/00* (2006.01)
(Continued)

(52) U.S. Cl.
CPC ....... *H05B 41/2887* (2013.01); *G03B 21/006* (2013.01); *G03B 21/2026* (2013.01);
(Continued)

(58) Field of Classification Search
CPC ............ H05B 41/2883; H05B 41/3928; H05B 41/2928; H05B 41/36; G03B 21/2026; G03B 21/005; G03B 21/2053
(Continued)

(56) References Cited

U.S. PATENT DOCUMENTS 7,023,144 B2  4/2006  Suzuki et al.
8,269,424 B2  9/2012  Terashima
(Continued)

FOREIGN PATENT DOCUMENTS

EP    2 693 847 A1    2/2014
JP    2006059790 A    3/2006
(Continued)

OTHER PUBLICATIONS

Oct. 18, 2016 Extended Search Report issued in European Patent Application No. 16172869.6.

*Primary Examiner* — Thai Pham
(74) *Attorney, Agent, or Firm* — Oliff PLC

(57) ABSTRACT

A discharge lamp driving device according to one aspect of the invention includes a discharge lamp driving section configured to supply a driving current to a discharge lamp including electrodes and a control section configured to control the discharge lamp driving section. The control section controls the discharge lamp driving section such that a mixed period is provided in which a first period in which an alternating current having a first frequency is supplied to the discharge lamp and a second period in which a direct current is supplied to the discharge lamp are alternately repeated. The first frequency includes a plurality of frequencies different from one another. The control section temporally changes the length of the first period.

22 Claims, 18 Drawing Sheets

(51) Int. Cl.
   *G03B 21/20* (2006.01)
   *H01J 61/02* (2006.01)
   *H01J 61/073* (2006.01)
   *H01J 61/54* (2006.01)
   *H04N 9/31* (2006.01)
   *H05B 41/392* (2006.01)

(52) U.S. Cl.
   CPC ........ *G03B 21/2053* (2013.01); *H01J 61/025* (2013.01); *H01J 61/073* (2013.01); *H01J 61/545* (2013.01); *H04N 9/3105* (2013.01); *H04N 9/3197* (2013.01); *H05B 41/2883* (2013.01); *H05B 41/392* (2013.01)

(58) Field of Classification Search
   USPC .... 315/209 R, 224, 246, 287, 291, 307, 308
   See application file for complete search history.

(56) References Cited

U.S. PATENT DOCUMENTS

| | | | |
|---|---|---|---|
| 8,324,828 B2 | 12/2012 | Yamamoto et al. | |
| 8,378,581 B2 | 2/2013 | Terashima | |
| 8,400,068 B2 | 3/2013 | Terashima | |
| 8,513,893 B2 | 8/2013 | Ono et al. | |
| 8,853,961 B2* | 10/2014 | Terashima | H05B 41/2928 315/246 |
| 9,030,111 B2 | 5/2015 | Imamura et al. | |
| 2005/0206326 A1 | 9/2005 | Suzuki et al. | |
| 2010/0127631 A1* | 5/2010 | Okamoto | H05B 41/2888 315/246 |
| 2011/0012524 A1 | 1/2011 | Terashima | |
| 2011/0012525 A1* | 1/2011 | Terashima | H05B 41/2883 315/246 |
| 2011/0018456 A1 | 1/2011 | Terashima | |
| 2011/0128508 A1* | 6/2011 | Yamada | H05B 41/2883 353/85 |
| 2011/0210680 A1 | 9/2011 | Yamamoto et al. | |
| 2012/0074858 A1 | 3/2012 | Ono et al. | |
| 2012/0313546 A1 | 12/2012 | Imamura et al. | |
| 2015/0201481 A1 | 7/2015 | Fukuda et al. | |

FOREIGN PATENT DOCUMENTS

| | | |
|---|---|---|
| JP | 4416125 B2 | 2/2010 |
| JP | 2011-023288 A | 2/2011 |
| JP | 2011-028943 A | 2/2011 |
| JP | 2011023154 A | 2/2011 |
| JP | 2011-124184 A | 6/2011 |
| JP | 2011-210564 A | 10/2011 |
| JP | 2011210565 A | 10/2011 |
| JP | 5278212 B2 | 9/2013 |
| JP | 5313932 B2 | 10/2013 |
| JP | 5333762 B2 | 11/2013 |
| JP | 5333764 B2 | 11/2013 |
| JP | 2014-032760 A | 2/2014 |
| JP | 5494120 B2 | 5/2014 |
| JP | 5625438 B2 | 11/2014 |

* cited by examiner

DISCHARGE LAMP DRIVING DEVICE, PROJECTOR, AND DISCHARGE LAMP DRIVING METHOD

BACKGROUND

1. Technical Field

The present invention relates to a discharge lamp driving device, a light source device, a projector, and a discharge lamp driving method.

2. Related Art

For example, JP-A-2011-124184 described a configuration for switching a frequency of an alternating current supplied to a high-pressure discharge lamp to a first frequency and a second frequency higher than the first frequency.

For example, in JP-A-2011-124184, a period in which the alternating current having the first frequency is supplied to the high-pressure discharge lamp (a discharge lamp) at length of a half cycle is provided for the purpose of suppressing wear of distal end portions of electrodes. However, in this method, for example, according to deterioration of the high-pressure discharge lamp, the wear of the distal end portions of the electrodes cannot be sufficiently suppressed. Therefore, the life of the high-pressure discharge lamp cannot be sufficiently improved.

SUMMARY

An advantage of some aspects of the invention is to provide a discharge lamp driving device that can improve the life of a discharge lamp, a light source device including the discharge lamp driving device, and a projector including the light source device and to provide a discharge lamp driving method that can improve the life of a discharge lamp.

A discharge lamp driving device according to an aspect of the invention includes: a discharge lamp driving section configured to supply a driving current to a discharge lamp including electrodes; and a control section configured to control the discharge lamp driving section. The control section controls the discharge lamp driving section such that a mixed period is provided in which a first period in which an alternating current having a first frequency is supplied to the discharge lamp and a second period in which a direct current is supplied to the discharge lamp are alternately repeated. The first frequency includes a plurality of frequencies different from one another. The control section temporally changes the length of the first period.

In the discharge lamp driving device according to the aspect of the invention, the control section temporally changes the length of the first period. Therefore, an interval of the second period provided in the mixed period changes according to the change in the length of the first period. In the second period, a heat load applied to the electrodes is large compared with the heat load in the first period because the direct current is supplied to the discharge lamp. Consequently, the heat load applied to a first electrode within a predetermined time period temporally changes. Therefore, a stimulus due to the heat load applied to the first electrode temporally changes to easily grow a protrusion of the first electrode. As a result, with the discharge lamp driving device according to the aspect, even when the discharge lamp is deteriorated, it is easy to grow the protrusion. It is possible to improve the life of the discharge lamp.

The control section may change the length of the first period to repeat an increase and a decrease.

With this configuration, the number of times the second period is provided within the predetermined time period changes while alternately repeating an increase and a decrease.

Consequently, the stimulus due to the heat load applied to the electrodes changes while alternately repeating an increase and a decrease. Therefore, it is easier to grow the protrusion of the electrode.

The first period may include a plurality of AC periods in which frequencies of an alternating current supplied to the discharge lamp are different from one another, and the control section may change each of the lengths of the AC periods.

With this configuration, compared with when only the length of a part of the plurality of AC periods is changed, it is easy to change the length of the first period. Since it is possible to adopt a configuration in which the lengths of the plurality of AC periods are the same, control of the discharge lamp driving section is simple.

The discharge lamp driving device may further include a voltage detecting section configured to detect an inter-electrode voltage of the discharge lamp, the control section may set the first frequency on the basis of the detected inter-electrode voltage, and the first frequency may be set higher as the inter-electrode voltage is higher.

With this configuration, when the discharge lamp is deteriorated, it is easy to stabilize a bright spot of arc discharge.

The control section may set the first frequency on the basis of driving power supplied to the discharge lamp, and the first frequency may be set higher as the driving power is smaller.

With this configuration, when the driving power decreases, it is easy to stabilize the bright spot of the arc discharge.

The first period may include a plurality of AC periods in which frequencies of an alternating current supplied to the discharge lamp are different from each other, and, in the first period, the frequency of the alternating current may be lower in the AC period provided temporally later.

With this configuration, when the first period and the second period are switched, it is possible to further increase fluctuation in the heat load applied to the electrodes.

The discharge lamp driving device may further include a voltage detecting section configured to detect an inter-electrode voltage of the discharge lamp, and the control section may cyclically change the length of the first period and change a cycle of the change in the length of the first period on the basis of at least one of the detected inter-electrode voltage and driving power supplied to the discharge lamp.

With this configuration, the control section cyclically changes the length of the first period. Therefore, according to the change in the length of the first period, the interval of the second period provided in the mixed period changes. In the second period, the heat load applied to the electrodes is large compared with the heat load in the first period because the direct current is supplied to the discharge lamp. Consequently, the heat load applied to the first electrode within the predetermined time period cyclically changes. Therefore, the stimulus due to the heat load applied to the first electrode temporally changes. It is easy to grow the protrusion of the first electrode. As a result, with the discharge lamp driving device according to the aspect, even when the discharge lamp is deteriorated, it is easy to grow the protrusion. It is possible to improve the life of the discharge lamp.

With this configuration, the cycle of the change in the length of the first period is changed on the basis of at least one of the detected inter-electrode voltage and the driving power supplied to the discharge lamp. Therefore, when the discharge lamp is deteriorated, it is possible to suitably change the cycle of the length of the first period when the discharge lamp is deteriorated or when the driving power changes. Consequently, it is possible to further improve the life of the discharge lamp.

When the detected inter-electrode voltage is higher than a first voltage, the control section may set the cycle shorter as the detected inter-electrode voltage is higher.

With this configuration, even when the discharge lamp is deteriorated, it is possible to grow protrusions of the electrodes.

When the detected inter-electrode voltage is higher than a second voltage higher than the first voltage, the control section may set the cycle longer as the detected inter-electrode voltage is higher.

With this configuration, when the deterioration of the discharge lamp progresses a certain degree or more, it is possible to suppress the discharge lamp from being deteriorated.

When the detected inter-electrode voltage is equal to or lower than the first voltage, the control section may maintain the cycle fixed.

With this configuration, it is possible to simplify the control of the discharge lamp driving section.

When the driving power is larger than first driving power, the control section may set the cycle longer as the driving power is larger.

With this configuration, when the driving power is large, it is possible to suppress the protrusions of the electrodes from being excessively melted.

When the driving power is equal to or smaller than the first driving power, the control section may maintain the cycle fixed.

With this configuration, it is possible to simplify the control of the discharge lamp driving section.

The control section may cyclically change the length of the first period to repeat an increase and a decrease.

With this configuration, the number of times the second period is provided in the predetermined time period changes while alternately repeating an increase and a decrease. Consequently, the stimulus due to the heat load applied to the electrodes changes while alternately repeating an increase and a decrease. Therefore, it is easier to grow the protrusion of the electrode.

The first period may include a plurality of AC periods in which frequencies of an alternating current supplied to the discharge lamp are different from one another, and the control section may cyclically change each of the lengths of the AC periods.

With this configuration, compared with when only the length of a part of the plurality of AC periods is changed, it is easy to change the length of the first period. Since it is possible to adopt a configuration in which the lengths of the plurality of AC periods are the same, control of the discharge lamp driving section is simple.

A light source device according to another aspect of the invention includes: a discharge lamp configured to emit light; and the discharge lamp driving device described above.

With the light source device according to the aspect, since the light source device includes the discharge lamp driving device, it is possible to improve the life of the discharge lamp.

A projector according to still another aspect of the invention includes: the light source device described above; a light modulating device configured to modulate light emitted from the light source device according to an image signal; and a projection optical system configured to project the light modulated by the light modulating device.

With the projector according to the aspect, since the projector includes the light source device, it is possible to improve the life of the discharge lamp.

A discharge lamp driving method according to yet another aspect of the invention is a discharge lamp driving method for supplying a driving current to a discharge lamp including electrodes and driving the discharge lamp, the discharge lamp driving method including: supplying, to the discharge lamp, the driving current including a mixed period in which a first period in which an alternating current having a first frequency is supplied to the discharge lamp and a second period in which a direct current is supplied to the discharge lamp are alternately repeated, the first frequency including a plurality of frequencies different from one another; and temporally changing the length of the first period.

With the discharge lamp driving method according to the aspect, it is possible to improve the life of the discharge lamp in the same manner as explained above.

The discharge lamp driving method may further include: cyclically changing the length of the first period; and changing a cycle of the change in the length of the first period.

With this method, it is possible to improve the life of the discharge lamp in the same manner as explained above.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
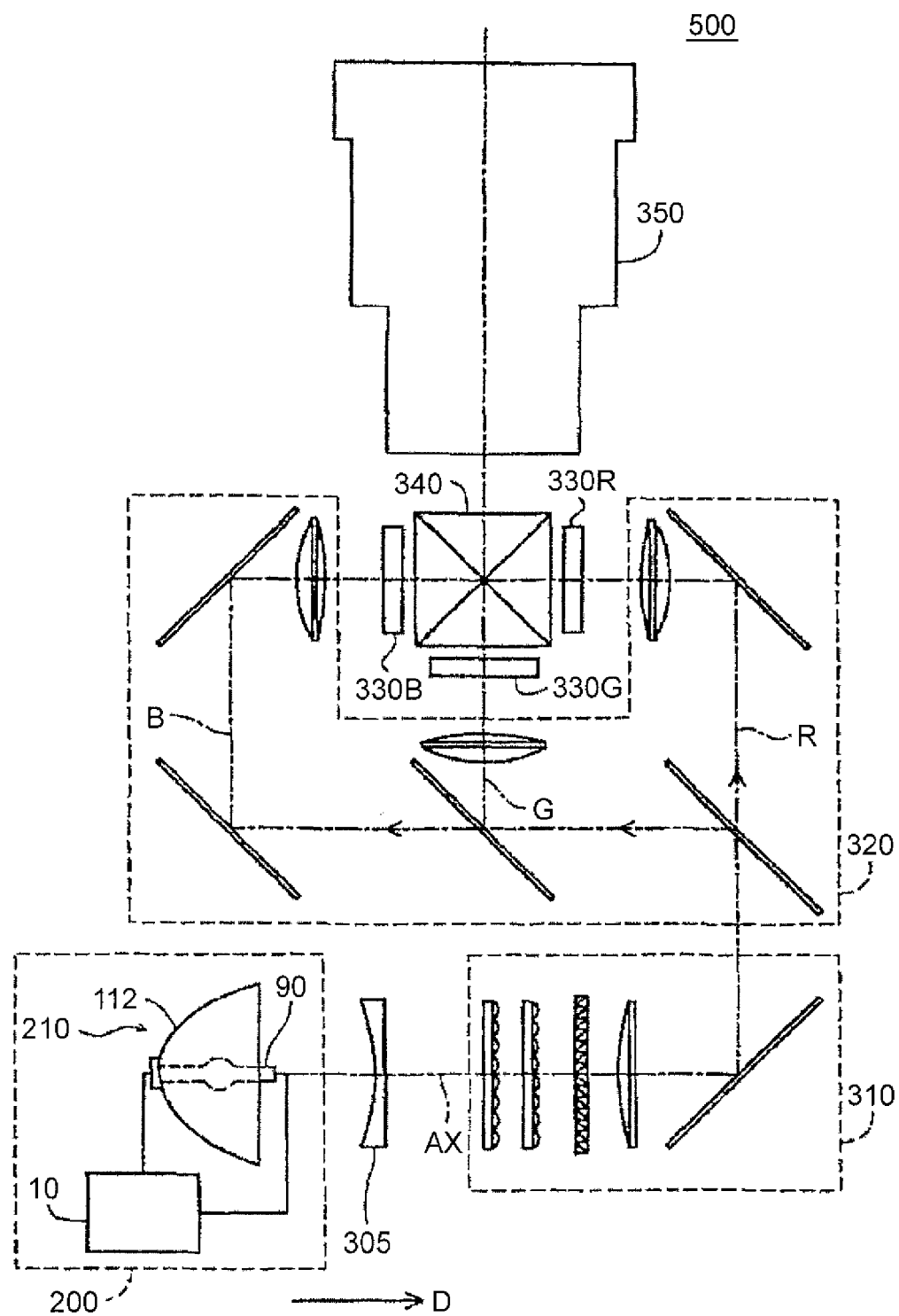
FIG. 1 is a schematic diagram of a projector according to a first embodiment.

Projectors according to embodiments of the invention are explained below with reference to the drawings.

Note that the scope of the invention is not limited by the embodiments explained below and can be optionally changed within the scope of the technical idea of the invention. In the drawings referred to below, scales, numbers, and the like in structures are varied from those in actual structures in order to clearly show components.

First Embodiment

As shown in FIG. 1, a projector 500 according to this embodiment includes a light source device 200, a collimating lens 305, an illumination optical system 310, a color separation optical system 320, three liquid crystal light valves (light modulating devices) 330R, 330G, and 330B, a cross-dichroic prism 340, and a projection optical system 350.

Light emitted from the light source device 200 is transmitted through the collimating lens 305 and made incident on the illumination optical system 310. The collimating lens 305 collimates the light emitted from the light source device 200.

The illumination optical system 310 adjusts the illuminance of the light emitted from the light source device 200 to equalize the illuminance on the liquid crystal light valves 330R, 330G, and 330B. Further, the illumination optical system 310 aligns polarization directions of the light emitted from the light source device 200 in one direction. This is for the purpose of effectively using the light emitted from the light source device 200 in the liquid crystal light valves 330R, 330G, and 330B.

The light with the illuminance distribution and the polarization directions adjusted is made incident on the color separation optical system 320. The color separation optical system 320 separates the incident light into three color lights of red light (R), green light (G), and blue light (B). The three color lights are respectively modulated according to video signals by the liquid crystal light valves 330R, 330G, and 330B associated with the color lights. The liquid crystal light valves 330R, 330G, and 330B include liquid crystal panels 560R, 560G, and 560B explained below and polarizing plates (not shown in the figure).

The polarizing plates are disposed on light incident sides and light emission sides of the respective liquid crystal panels 560R, 560G, and 560B.

The modulated three color lights are combined by the cross-dichroic prism 340. The combined light is made incident on the projection optical system 350. The projection optical system 350 projects the incident light on a screen 700 (see FIG. 3). Consequently, a video is displayed on the screen 700. Note that, as the configurations of the collimating lens 305, the illumination optical system 310, the color separation optical system 320, the cross-dichroic prism 340, and the projection optical system 350, well-known configurations can be adopted.

Figure 2:
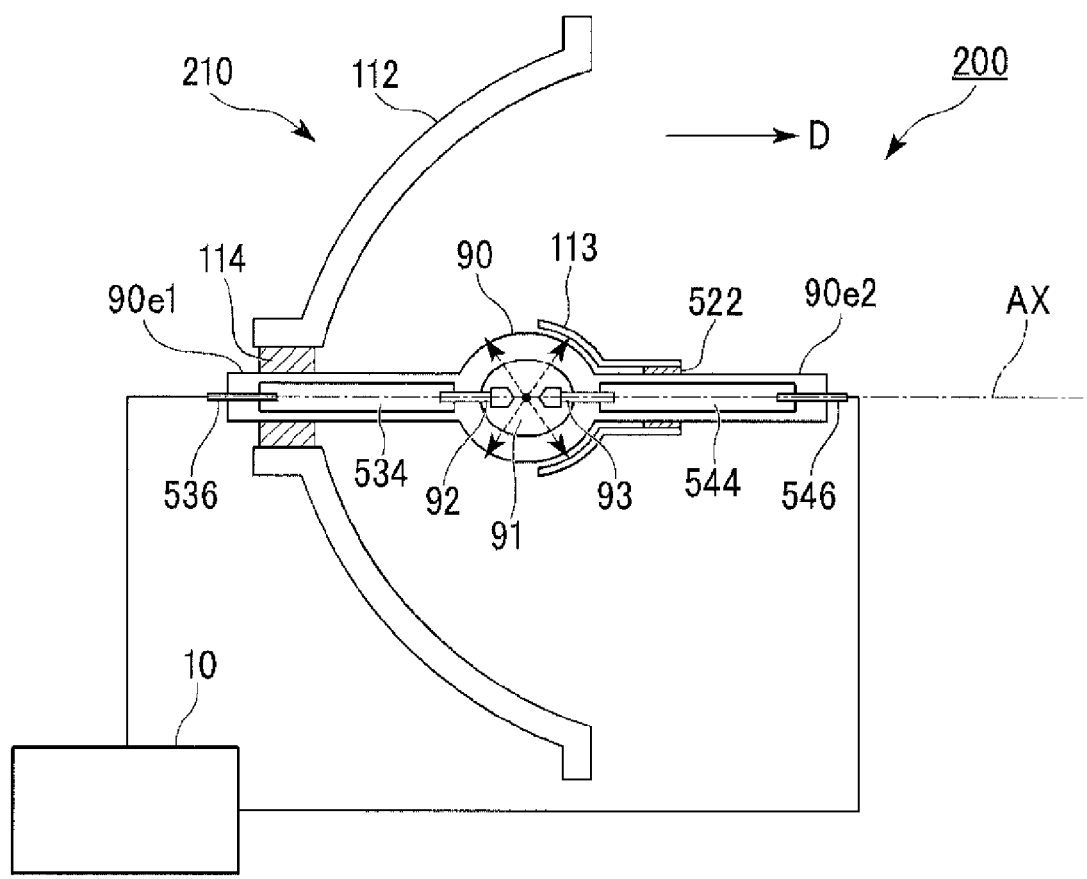
FIG. 2 is a diagram of a discharge lamp in the first embodiment.

FIG. 2 is a sectional view showing the configuration of the light source device 200. The light source device 200 includes a light source unit 210 and a discharge lamp lighting device (a discharge lamp driving device) 10. In FIG. 2, a sectional view of the light source unit 210 is shown. The light source unit 210 includes a main reflection mirror 112, a discharge lamp 90, and a sub-reflection mirror 113.

The discharge lamp lighting device 10 supplies a driving current I to the discharge lamp 90 and lights the discharge lamp 90. The main reflection mirror 112 reflects light emitted from the discharge lamp 90 toward a radiating direction D. The radiating direction D is parallel to an optical axis AX of the discharge lamp 90.

The shape of the discharge lamp 90 is a bar shape extending along the radiating direction D. One end portion of the discharge lamp 90 is represented as a first end portion 90e1. The other end portion of the discharge lamp 90 is represented as a second end portion 90e2. The material of the discharge lamp 90 is, for example, a light transmissive material such as quartz glass. The center portion of the discharge lamp 90 swells in a spherical shape. The inside of the discharge lamp 90 is a discharge space 91. In the discharge space 91, gas, which is a discharge medium, including rare gas and a metal halogen compound is encapsulated.

The distal ends of a first electrode (an electrode) 92 and a second electrode (an electrode) 93 project to the discharge space 91. The first electrode 92 is disposed on the first end portion 90e1 side of the discharge space 91. The second electrode 93 is disposed on the second end portion 90e2 side of the discharge space 91. The shape of the first electrode 92 and the second electrode 93 is a bar shape extending along the optical axis AX. In the discharge space 91, the electrode distal end portions of the first electrode 92 and the second electrode 93 are disposed to be opposed a predetermined distance apart from each other. The material of the first electrode 92 and the second electrode 93 is, for example, metal such as tungsten.

A first terminal 536 is provided at the first end portion 90e1 of the discharge lamp 90. The first terminal 536 and the first electrode 92 are electrically connected by a conductive member 534 that pierces through the inside of the discharge lamp 90. Similarly, a second terminal 546 is provided at the second end portion 90e2 of the discharge lamp 90. The second terminal 546 and the second electrode 93 are electrically connected by a conductive member 544 that pierces through the inside of the discharge lamp 90. The material of the first terminal 536 and the second terminal 546 is, for example, metal such as tungsten. As the material of the conductive members 534 and 544, for example, molybdenum foil is used.

The first terminal 536 and the second terminal 546 are connected to the discharge lamp lighting device 10. The discharge lamp lighting device 10 supplies a driving current I for driving the discharge lamp 90 to the first terminal 536 and the second terminal 546. As a result, are discharge occurs between the first electrode 92 and the second electrode 93. Light (discharge light) generated by the arc discharge is radiated to all directions from a discharge position as indicated by broken line arrows.

The main reflection mirror 112 is fixed to the first end portion 90e1 of the discharge lamp 90 by a fixing member 114. The main reflection mirror 112 reflects, toward the radiating direction D, light traveling toward the opposite side of the radiating direction D in the discharge light. The shape of a reflection surface (a surface on the discharge lamp 90 side) of the main reflection mirror 112 is not particularly limited as long as the reflection surface can reflect the discharge light to the radiating direction D. For example, the shape may be a spheroid shape or a paraboloid shape. For example, when the shape of the reflection surface of the main reflection mirror 112 is formed in the paraboloid shape, the main reflection mirror 112 can convert the discharge light into light substantially parallel to the optical axis AX. Consequently, the collimating lens 305 can be omitted. The sub-reflection mirror 113 is fixed to the second end portion 90e2 side of the discharge lamp 90 by a fixing member 522. The shape of a reflection surface (a surface on the discharge lamp 90 side) of the sub-reflection mirror 113 is a spherical surface shape that surrounds a portion on the second end portion 90e2 side of the discharge space 91. The sub-reflection mirror 113 reflects, toward the main reflection mirror 112, light traveling toward the opposite side of the disposed side of the main reflection mirror 112 in the discharge light. Consequently, it is possible to improve efficiency of use of the light radiated from the discharge space 91.

The material of the fixing members 114 and 522 is not particularly limited as long as the material is a heat resistant material that can withstand heat generation from the discharge lamp 90. The material is, for example, an inorganic adhesive. A method of fixing the disposition of the main reflection mirror 112 and the sub-reflection mirror 113 and the discharge lamp 90 is not limited to a method of fixing the main reflection mirror 112 and the sub-reflection mirror 113 to the discharge lamp 90. Any method can be adopted. For example, the discharge lamp 90 and the main reflection mirror 112 may be independently fixed to a housing (not shown in the figure) of the projector 500. The same applies to the sub-reflection mirror 113.

The circuit configuration of the projector 500 is explained below.

Figure 3:
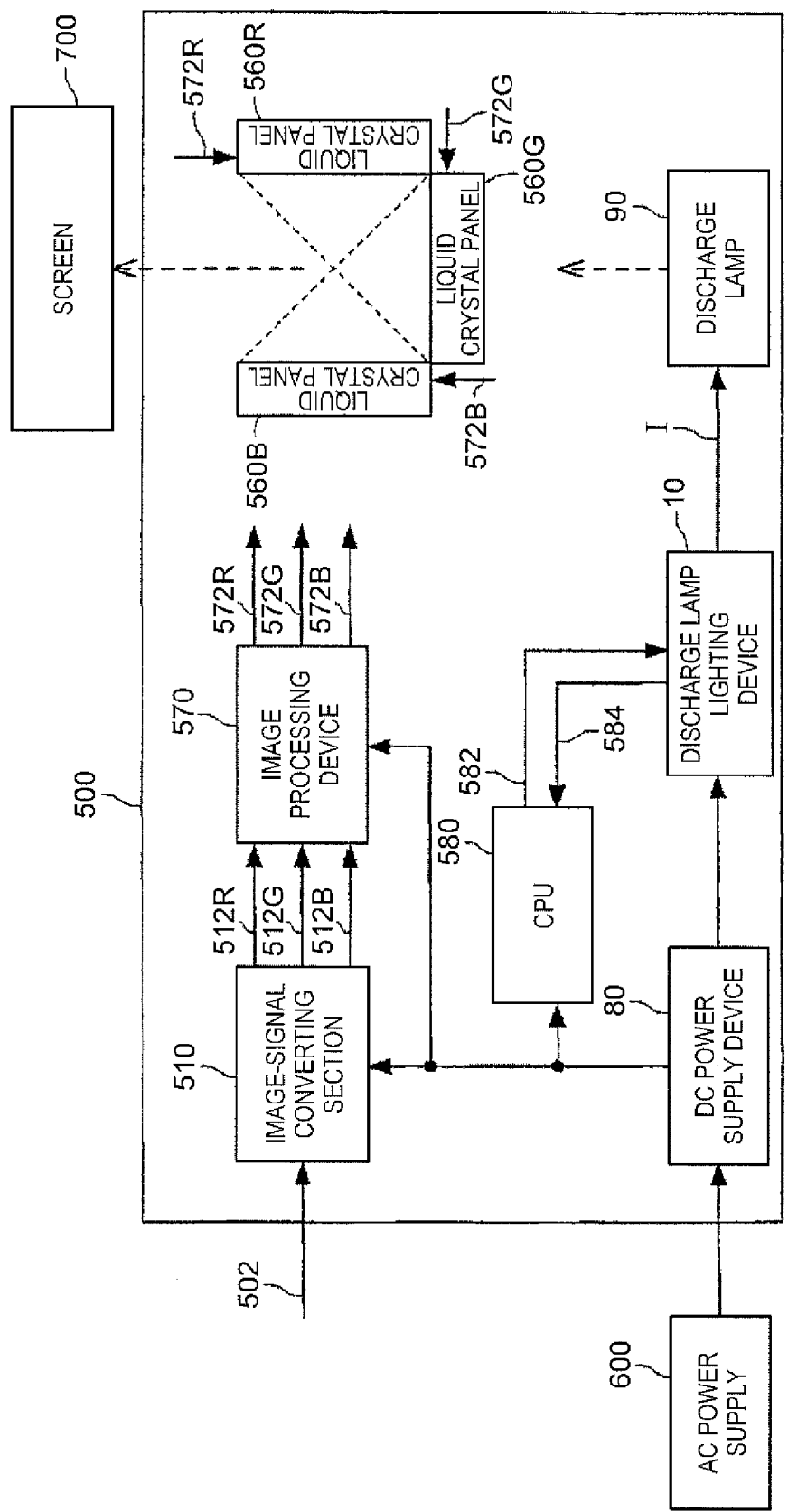
FIG. 3 is a block diagram showing various components of the projector according to the first embodiment.

FIG. 3 is a diagram showing an example of the circuit configuration of the projector 500 in this embodiment. The projector 500 includes, besides the optical systems shown in FIG. 1, an image-signal converting section 510, a DC power supply device 80, the liquid crystal panels 560R, 560G and 560B, an image processing device 570, and a CPU (Central Processing Unit) 580.

The image-signal converting section 510 converts an image signal 502 (a luminance-color difference signal, an analog RGB signal, etc.) input from the outside into a digital RGB signal having a predetermined word length, generates image signals 512R, 512G, and 512B, and supplies the image signals 512R, 512G, and 512B to the image processing device 570.

The image processing device 570 performs image processing on each of the three image signals 512R, 512G, and 512B. The image processing device 570 supplies driving signals 572R, 572G and 572B for respectively driving the liquid crystal panels 560R, 560G, and 560B to the liquid crystal panels 560R, 560G and 560B.

The DC power supply device 80 converts an AC voltage supplied from an external AC power supply 600 into a fixed DC voltage. The DC power supply device 80 supplies the DC voltage to the image-signal converting section 510 and the image processing device 570 present on a secondary side of a transformer (although not shown in the figure, included in the DC power supply device 80) and the discharge lamp lighting device 10 present on a primary side of the transformer.

The discharge lamp lighting device 10 generates a high voltage between the electrodes of the discharge lamp 90 during a start, causes dielectric breakdown, and forms a discharge path. Thereafter, the discharge lamp lighting device 10 supplies the driving current I for the discharge lamp 90 to maintain electric discharge.

The liquid crystal panels 560R, 560G, and 560B are respectively provided in the liquid crystal light valves 330R, 330G and 330B. The liquid crystal panels 560R, 560G, and 560B modulate, respectively on the basis of the driving signals 572R, 572G; and 572B, transmittances (luminances) of the color lights made incident on the liquid crystal panels 560R, 560G and 560B via the optical systems.

The CPU 580 controls various operations from a lighting start to extinction of the projector 500. For example, in FIG. 3, the CPU 580 outputs a lighting command and an extinction command to the discharge lamp lighting device 10 via a communication signal 582. The CPU 580 receives lighting information of the discharge lamp 90 from the discharge lamp lighting device 10 via a communication signal 584.

The configuration of the discharge lamp lighting device 10 is explained below.

Figure 4:
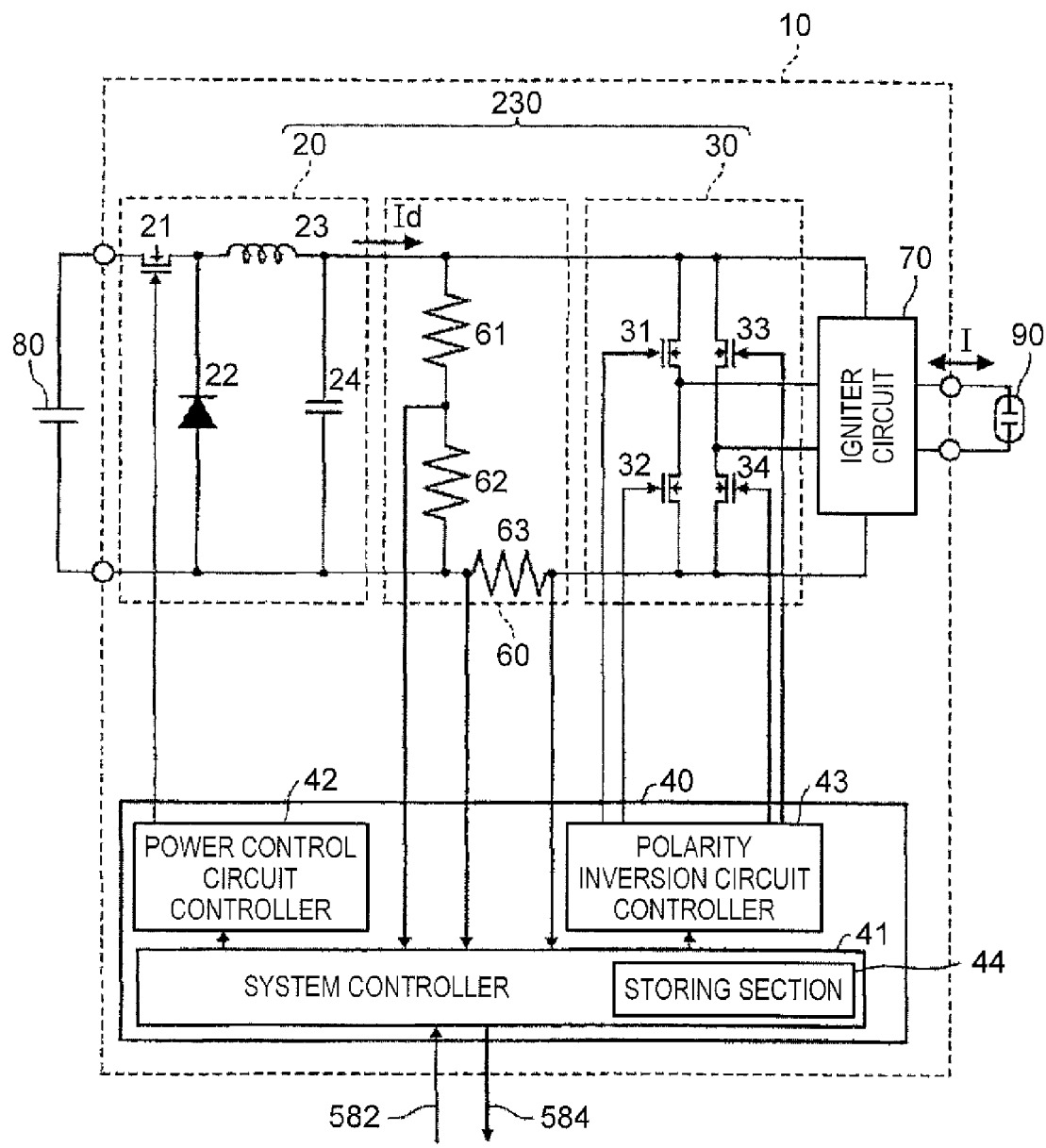
FIG. 4 is a circuit diagram of a discharge lamp lighting device in the first embodiment.

FIG. 4 is a diagram showing an example of the circuit configuration of the discharge lamp lighting device 10.

The discharge lamp lighting device 10 includes, as shown in FIG. 4, a power control circuit 20, a polarity inversion circuit 30, a control section 40, an operation detecting section 60, and an igniter circuit 70.

The power control circuit 20 generates driving power supplied to the discharge lamp 90. In this embodiment, the power control circuit 20 is configured by a down-chopper circuit that receives a voltage from the DC power supply device 80 as an input, steps down the input voltage, and outputs a direct current Id.

The power control circuit 20 includes a switch element 21, a diode 22, a coil 23, and a capacitor 24. The switch element 21 is configured by, for example, a transistor. In this embodiment, one end of the switch element 21 is connected to a positive voltage side of the DC power supply device 80 and the other end is connected to a cathode terminal of the diode 22 and one end of the coil 23.

One end of the capacitor 24 is connected to the other end of the coil 23. The other end of the capacitor 24 is connected to an anode terminal of the diode 22 and a negative voltage side of the DC power supply device 80. A current control signal is input to a control terminal of the switch element 21 from the control section 40 explained below. ON/OFF of the switch element 21 is controlled. As the current control signal, for example, a PWM (Pulse Width Modulation) control signal may be used.

When the switch element 21 is turned on, an electric current flows to the coil 23 and energy is accumulated in the coil 23. Thereafter, when the switch element 21 is turned off, the energy accumulated in the coil 23 is discharged through a route that passes the capacitor 24 and the diode 22. As a result, the direct current Id corresponding to a rate of time in which the switch element 21 is ON is generated.

The polarity inversion circuit 30 inverts, at predetermined timing, the polarity of the direct current Id input from the power control circuit 20. Consequently, the polarity inversion circuit 30 generates the driving current I, which is a direct current continuing for a controlled time, or the driving current I, which is an alternating current having any frequency, and outputs the driving current I. In this embodiment, the polarity inversion circuit 30 is configured by an inverter bridge circuit (a full-bridge circuit).

The polarity inversion circuit 30 includes, for example, a first switch element 31, a second switch element 32, a third switch element 33, and a fourth switch element 34 configured by transistors or the like. The polarity inversion circuit 30 includes a configuration in which the first switch element 31 and the second switch element 32 connected in series and the third switch element 33 and the fourth switch element 34 connected in series are connected to each other in parallel. Polarity inversion control signals are respectively input to control terminals of the first switch element 31, the second switch element 32, the third switch element 33, and the fourth switch element 34 from the control section 40. ON/OFF operations of the first switch element 31, the second switch element 32, the third switch element 33, and the fourth switch element 34 are controlled on the basis of the polarity inversion control signals.

In the polarity inversion circuit 30, operation for alternatingly turning on and off the first and fourth switch elements 31 and 34 and the second and third switch elements 32 and 33 is repeated. Consequently, the polarities of the direct current Id output from the power control circuit 20 are alternately inverted. The polarity inversion circuit 30 generates the driving current I, which is a direct current for continuing the same polarity state for a controlled time, or the driving current I, which is an alternating current having a controlled frequency, and outputs the driving current I from a common connection point of the first switch element 31 and the second switch element 32 and a common connection point of the third switch element 33 and the fourth switch element 34.

That is, the polarity inversion circuit 30 is controlled such that, when the first switch element 31 and the fourth switch element 34 are ON, the second switch element 32 and the third switch element 33 are OFF and, when the first switch element 31 and the fourth switch element 34 are OFF, the second switch element 32 and the third switch element 33 are ON. Therefore, when the first switch element 31 and the fourth switch element 34 are ON, the driving current I flowing from one end of the capacitor 24 to the first switch element 31, the discharge lamp 90, and the fourth switch element 34 in this order is generated. When the second switch element 32 and the third switch element 33 are ON, the driving current I flowing from one end of the capacitor 24 to the third switch element 33, the discharge lamp 90, and the second switch element 32 in this order is generated. In this embodiment, a combined portion of the power control circuit 20 and the polarity inversion circuit 30 corresponds to a discharge lamp driving section 230. That is, the discharge lamp driving section 230 supplies the driving current I for driving the discharge lamp 90 to the discharge lamp 90.

The control section 40 controls the discharge lamp driving section 230. In the example shown in FIG. 4, the control section 40 controls the power control circuit 20 and the polarity inversion circuit 30 to thereby control parameters such as a retention time in which the driving current I continues the same polarity, a current value (a power value of the driving power) of the driving current I, and a frequency. The control section 40 performs, on the polarity inversion circuit 30, at polarity inversion timing of the driving current I, polarity inversion control for controlling the retention time in which the driving current I continues at the same polarity, the frequency of the driving current I, and the like. The control section 40 performs, on the power control circuit 20, current control for controlling a current value of the output direct current Id.

In this embodiment, the control section 40 is capable of executing AC driving, DC driving, and mixed driving. The AC driving is driving in which an alternating current is supplied to the discharge lamp 90. The DC driving is driving in which a direct current is supplied to the discharge lamp 90. The mixed driving is driving in which the AC driving and the DC driving are alternately executed. Driving current waveforms of the driving current I supplied to the discharge lamp 90 by the respective kinds of discharge lamp driving are explained in detail below.

The configuration of the control section 40 is not particularly limited. In this embodiment, the control section 40 includes a system controller 41, a power control circuit controller 42, and a polarity inversion circuit controller 43. Note that a part of or the entire control section 40 may be configured by a semiconductor integrated circuit.

The system controller 41 controls the power control circuit controller 42 and the polarity inversion circuit controller 43 to thereby control the power control circuit 20 and the polarity inversion circuit 30. The system controller 41 may control the power control circuit controller 42 and the polarity inversion circuit controller 43 on the basis of a lamp voltage (an inter-electrode voltage) Vla and the driving current I detected by the operation detecting section 60.

In this embodiment, a storing section 44 is connected to the system controller 41.

The system controller 41 may control the power control circuit 20 and the polarity inversion circuit 30 on the basis of information stored in the storing section 44. In the storing section 44, for example, information concerning driving parameters such as the retention time in which the driving current I continues at the same polarity and a current value, a frequency, a waveform, and a modulation pattern of the driving current I may be stored.

The power control circuit controller 42 outputs a current control signal to the power control circuit 20 on the basis of a control signal from the system controller 41 to thereby control the power control circuit 20.

The polarity inversion circuit controller 43 outputs a polarity inversion control signal to the polarity inversion circuit 30 on the basis of a control signal from the system controller 41 to thereby control the polarity inversion circuit 30.

The control section 40 can be realized using a dedicated circuit to perform the control explained above and various kinds of control of processing explained below. On the other hand, for example, a CPU executes a control program stored in the storing section 44, whereby the control section 40 can function as a computer and perform various kinds of control of these kinds of processing.

Figure 5:
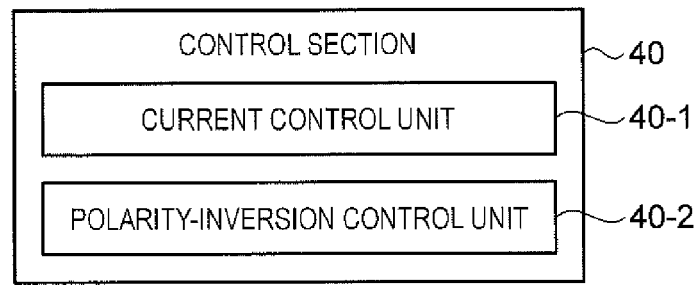
FIG. 5 is a block diagram showing a configuration example of a control section in the first embodiment.

FIG. 5 is a diagram for explaining another configuration example of the control section 40. As shown in FIG. 5, the control section 40 may be configured to function as, according to a control program, a current control unit 40-1 that controls the power control circuit 20 and a polarity-inversion control unit 40-2 that controls the polarity inversion circuit 30.

In the example shown in FIG. 4, the control section 40 is configured as a part of the discharge lamp lighting device 10. On the other hand, the CPU 580 may be configured to perform a part of the functions of the control section 40.

In this embodiment, the operation detecting section 60 includes a voltage detecting section that detects the lamp voltage Vla of the discharge lamp 90 and outputs lamp voltage information to the control section 40. The operation detecting section 60 may include, for example, a current detecting section that detects the driving current I and outputs driving current information to the control section 40. In this embodiment, the operation detecting section 60 includes a first resistor 61, a second resistor 62, and a third resistor 63.

In this embodiment, the voltage detecting section of the operation detecting section 60 detects the lamp voltage Vla with a voltage divided by the first resistor 61 and the second resistor 62 connected in series to each other in parallel to the discharge lamp 90. In this embodiment, the current detecting section detects the driving current I with a voltage generated in the third resistor 63 connected in series to the discharge lamp 90.

The igniter circuit 70 operates only during a lighting start of the discharge lamp 90. The igniter circuit 70 supplies, to an inter-electrode space (between the first electrode 92 and the second electrode 93) of the discharge lamp 90, a high voltage (a voltage higher than a voltage during normal lighting of the discharge lamp 90) necessary for causing dielectric breakdown in the inter-electrode space (between the first electrode 92 and the second electrode 93) of the discharge lamp 90 during the lighting start of the discharge lamp 90 and forming a discharge path. In this embodiment, the igniter circuit 70 is connected in parallel to the discharge lamp 90.

Figure 6A:
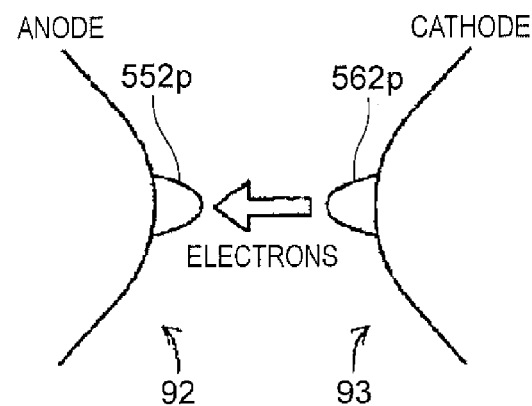
FIG. 6A is a diagram showing a state of protrusions at electrode distal ends of the discharge lamp.
Figure 6B:
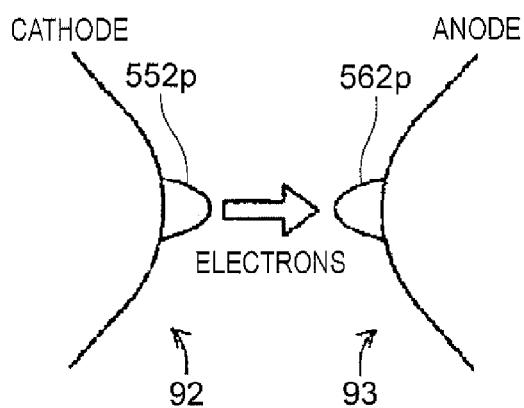
FIG. 6B is a diagram showing a state of the protrusions at the electrode distal ends of the discharge lamp.

In FIGS. 6A and 6B, the distal end portions of the first electrode 92 and the second electrode 93 are shown. Protrusions 552p and 562p are respectively formed at the distal ends of the first electrode 92 and the second electrode 93.

Electric discharge that occurs between the first electrode 92 and the second electrode 93 mainly occurs between the protrusion 552p and the protrusion 562p. When the protrusions 552p and 562p are present as in this embodiment, compared with when protrusions are absent, it is possible to suppress movement of discharge positions (arc positions) in the first electrode 92 and the second electrode 93.

FIG. 6A shows a first polarity state in which the first electrode 92 operates as an anode and the second electrode 93 operates as a cathode. In the first polarity state, electrons move from the second electrode 93 (the cathode) to the first electrode 92 (the anode) according to electric discharge. The electrons are emitted from the cathode (the second electrode 93). The electrons emitted from the cathode (the second electrode 93) collide with the distal end of the anode (the first electrode 92). Heat is generated by the collision and the temperature of the distal end (the protrusion 552p) of the anode (the first electrode 92) rises.

FIG. 6B shows a second polarity state in which the first electrode 92 operates as a cathode and the second electrode 93 operates as an anode. In the second polarity state, contrary to the first polarity state, electrons move from the first electrode 92 to the second electrode 93. As a result, the temperature of the distal end (the protrusion 562p) of the second electrode 93 rises.

In this way, since the driving current I is supplied to the discharge lamp 90, the temperature of the anode, with which the electrons collide, rises. On the other hand, the temperature of the cathode, which emits the electrons, drops while the cathode is emitting the electrons to the anode.

An inter-electrode distance between the first electrode 92 and the second electrode 93 increases according to deterioration of the protrusions 552p and 562p. This is because the protrusions 552p and 562p are worn. When the inter-electrode distance increases, since the resistance between the first electrode 92 and the second electrode 93 increases, the lamp voltage Vla increases. Therefore, it is possible to detect a change in the inter-electrode distance, that is, a deterioration degree of the discharge lamp 90 by referring to the lamp voltage Vla.

Note that the first electrode 92 and the second electrode 93 have the same configuration. Therefore, in the following explanation, only the first electrode 92 is sometimes representatively explained. The protrusion 552p at the distal end of the first electrode 92 and the protrusion 562p at the distal end of the second electrode 93 have the same configuration. Therefore, in the following explanation, only the protrusion 552p is sometimes representatively explained.

The control of the discharge lamp driving section 230 by the control section 40 in this embodiment is explained. In this embodiment, the control section 40 controls the discharge lamp driving section 230 with the mixed driving for alternately repeating the AC driving and the DC driving.

Figure 7:
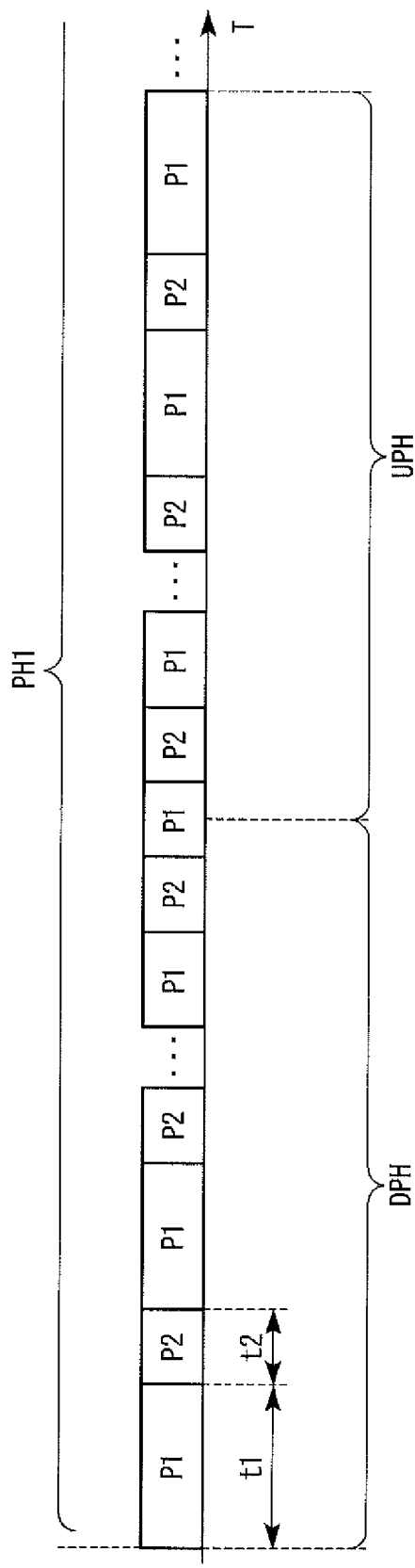
FIG. 7 is a schematic diagram showing a change in a period in which a driving current is supplied to a discharge lamp in the first embodiment.
Figure 8:
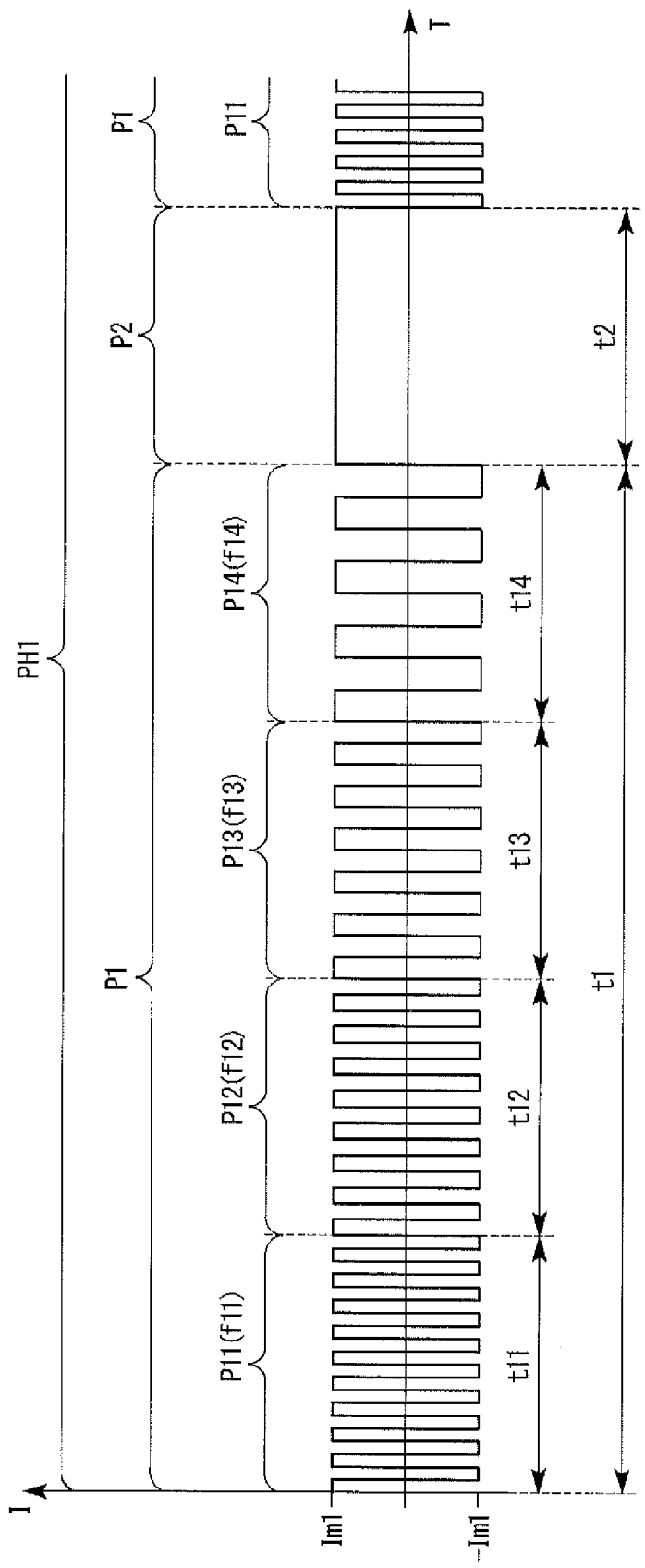
FIG. 8 is a diagram showing an example of a driving current waveform in a mixed period in the first embodiment.

FIG. 7 is a schematic diagram showing a change in a period in which the driving current I is supplied to the discharge lamp 90 in this embodiment. FIG. 8 is a diagram showing an example of a driving current waveform in this embodiment. In FIG. 8, the ordinate indicates the driving current I and the abscissa indicates time T. The driving current I in a first polarity state is shown as positive and the driving current I in a second polarity state is shown as negative.

As shown in FIG. 7, in this embodiment, a mixed period PH1 in which a first period P1 and a second period P2 are alternately repeated is provided. The mixed period PH1 is a period in which the mixed driving is executed. The first period P1 is a period in which the AC driving is executed. The second period P2 is a period in which the DC driving is executed. The number of first periods P1 and the number of second periods P2 in the mixed period PH1 are not particularly limited.

As shown in FIG. 8, the first period P1 is a period in which an alternating current having a first frequency f1 is supplied to the discharge lamp 90. In this embodiment, the first period P1 includes a first AC period (an AC period) P11, a second AC period (an AC period) P12, a third AC period (an AC period) P13, and a fourth AC period (an AC period) P14. The first AC period P1, the second AC period P12, the third AC period P13, and the fourth AC period P14 are continuously provided in this order.

In this embodiment, an alternating current in the first AC period P11, the second AC period P12, the third AC period P13, and the fourth AC period P14 is, for example, a rectangular wave alternating current, the polarity of which is inverted a plurality of times between a current value Im1 and a current value −Im1.

A first frequency f11 in the first AC period P11, a first frequency f12 in the second AC period P12, a first frequency f13 in the third AC period P13, and a first frequency f14 in the fourth AC period P14 are different from one another. That is, the first frequency f1 includes a plurality of frequencies different from each other. The first period P1 includes a plurality of AC periods in which frequencies of the alternating current supplied to the discharge lamp 90 are different from one another.

The first frequency f11, the first frequency f12, the first frequency f13, and the first frequency f14 decrease in this order relative to one another. That is, in the first period P1, the frequency of the alternating current is lower in the AC period provided temporally later.

In this embodiment, the control section 40 sets the first frequencies f11 to f14 on the basis of both of the lamp voltage Vla detected by the voltage detecting section in the operation detecting section 60 and driving power Wd supplied to the discharge lamp 90. That is, the control section 40 sets the first frequencies f11 to f14 on the basis of at least one of the lamp voltage Vla and the driving power Wd. In this embodiment, the control section 40 changes the first frequencies f11 to f14 on the basis of at least one of the lamp voltage Vla and the driving power Wd.

Figure 9:
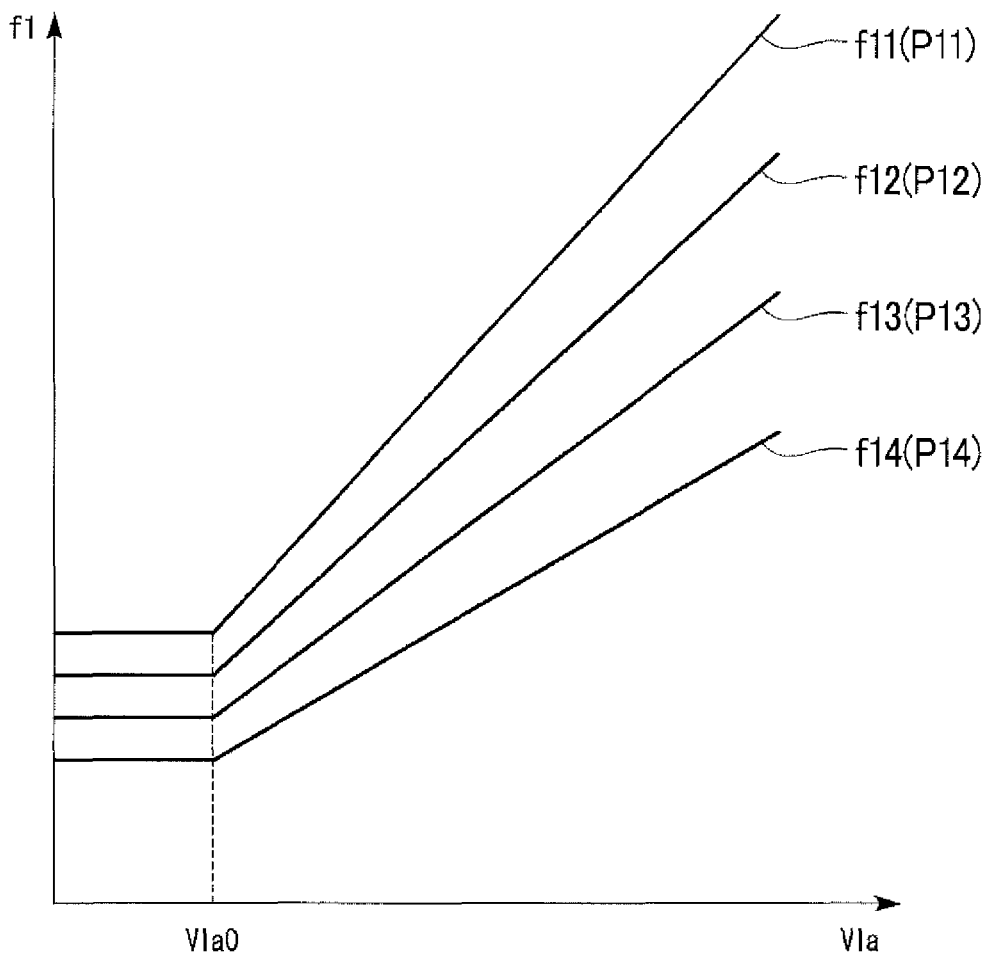
FIG. 9 is a graph showing an example of a relation between a lamp voltage and first frequencies in the first embodiment.

FIG. 9 is a graph showing an example of a relation between the lamp voltage Vla and the first frequencies f11 to f14. In FIG. 9, the ordinate indicates the first frequency f1 and the abscissa indicates the lamp voltage Vla. FIG. 9 shows a relation between the lamp voltage Vla and the first frequencies f11 to f14 at the time when the driving power Wd is a fixed value.

In the example shown in FIG. 9, in a range in which a value of the lamp voltage Vla is smaller than a predetermined value Vla0, the first frequencies f11 to f14 are fixed. In the example shown in FIG. 9, in a range in which the value of the lamp voltage Vla is equal to or larger than the predetermined value Vla0, the first frequencies f11 to f14 are set higher as the lamp voltage Vla is higher (increases). In a range in which the value of the lamp voltage Vla is equal to or larger than the predetermined value Vla0, the relation between the first frequencies f11 to f14 and the lamp voltage Vla is represented by, for example, a linear function.

In the example shown in FIG. 9, a tilt of a change in the first frequency f1 with respect to the lamp voltage Vla in the range in which the value of the lamp voltage Vla is equal to or larger than the predetermined value Vla0 is larger in the order of the first frequency f11, the first frequency f12, the first frequency f13, and the first frequency f14. That is, as the lamp voltage Vla is higher, a difference in a value among the first frequencies f11 to f14 is larger.

Figure 10:
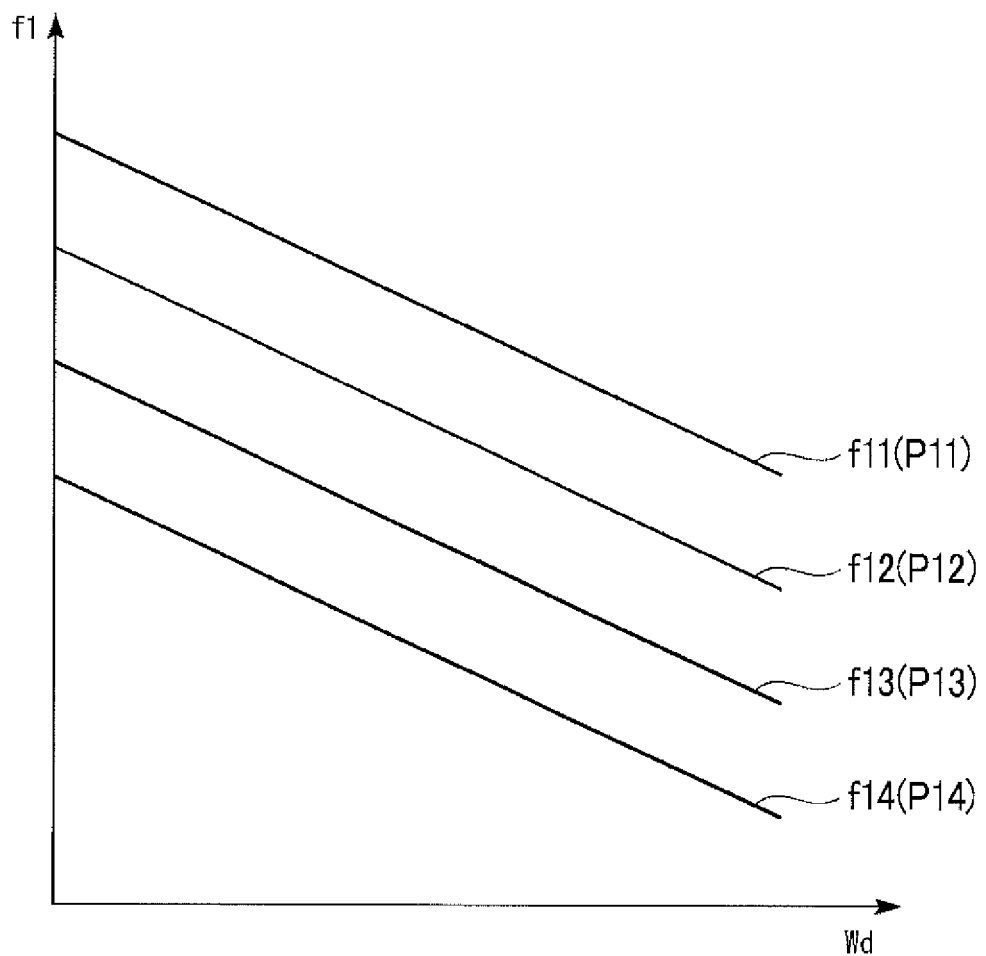
FIG. 10 is a graph showing an example of a relation between driving power and the first frequencies in the first embodiment.

FIG. 10 is a graph showing an example of a relation between the driving power Wd and the first frequencies f11 to f14. In FIG. 10, the ordinate indicates the first frequency f1 and the abscissa indicates the driving power Wd. FIG. 10 shows a relation between the driving power Wd and the first frequencies f11 to f14 at the time when the lamp voltage Vla is a fixed value.

In the example shown in FIG. 10, the first frequencies f11 to f14 are set higher as the driving power Wd is smaller. The relation between the first frequencies f11 to f14 and the driving power Wd is represented by, for example, a linear function. In FIG. 10, a tilt of a change in the first frequency f1 with respect to the driving power Wd is, for example, the same at all of the first frequencies f11 to f14.

In this embodiment, the first frequency f1 is set on the basis of both of the change in the first frequency f1 with respect to the lamp voltage Vla shown in FIG. 9 and the change in the first frequency f1 with respect to the driving power Wd shown in FIG. 10.

Specifically, for example, the value of the first frequency f1 is set by adding a change amount of the first frequency f1 due to the change in the driving power Wd to or subtracting the change from a value of the first frequency f1 set with respect to the lamp voltage Vla. The value of the first frequency f1 is, for example, equal to or larger than 50 Hz and equal to or smaller than 50 kHz.

Note that, in this specification, "the first frequency f1 is set higher as the lamp voltage Vla is higher (increases)" may be only within a predetermined range of the value of the lamp voltage Vla as in the example shown in FIG. 9 or may be within all ranges that the value of the lamp voltage Vla can take.

In this specification, "the first frequency f1 is set higher as the driving power Wd is smaller" may be within all ranges that the value of the driving power Wd can take as in the example shown in FIG. 10 or may be only within a predetermined range of the value of the driving power Wd.

In this specification, "the first frequency f1 is set higher as the lamp voltage Vla is higher (increases)" includes such setting at the time when the driving power Wd is fixed. In this specification, "the first frequency f1 is set higher as the driving power Wd is smaller" includes such setting at the time when the lamp voltage Vla is fixed.

That is, for example, when the first frequency f1 is set on the basis of both of the lamp voltage Vla and the driving power Wd as in this embodiment, an actual first frequency f1 sometimes decreases because the driving power Wd increases even when the lamp voltage Vla increases. The actual first frequency f1 sometimes increases because the lamp voltage Vla decreases even when the driving power Wd increases.

In this embodiment, a start polarity in the first period P1 is a polarity opposite to an end polarity in a period provided immediately before the first period P1, that is, in this embodiment, the second period P2. The start polarity is the polarity of the driving current I at a point in time when a certain period starts. The end polarity is the polarity of the driving current I at a point in time when the certain period ends.

Specifically, for example, when the polarity of a direct current supplied to the discharge lamp 90 in the second period P2 provided immediately before the first period P1 is the second polarity, the end polarity in the second period P2 is the second polarity. Therefore, the start polarity in the first period P1 is the first polarity. In this embodiment, the start polarity in the first period P1 is a start polarity in the first AC period P11.

As shown in FIG. 7, in this embodiment, length t1 of the first period P1 changes every time the first period P1 is provided. That is, the control section 40 temporally changes the length t1 of the first period P1. In this embodiment, a decrease period DPH and an increase period UPH are provided in the mixed period PH1. The decrease period DPH is a period in which the length t1 of the first period P1 temporally decreases. The increase period UPH is a period in which the length t1 of the first period P1 temporally increases. In the example shown in FIG. 7, in the decrease period DPH, the length t1 of the first period P1 decreases every time the first period P1 is provided. In the example shown in FIG. 7, in the increase period UPH, the length t1 of the first period P1 increases every time the first period P1 is provided.

Figure 11:
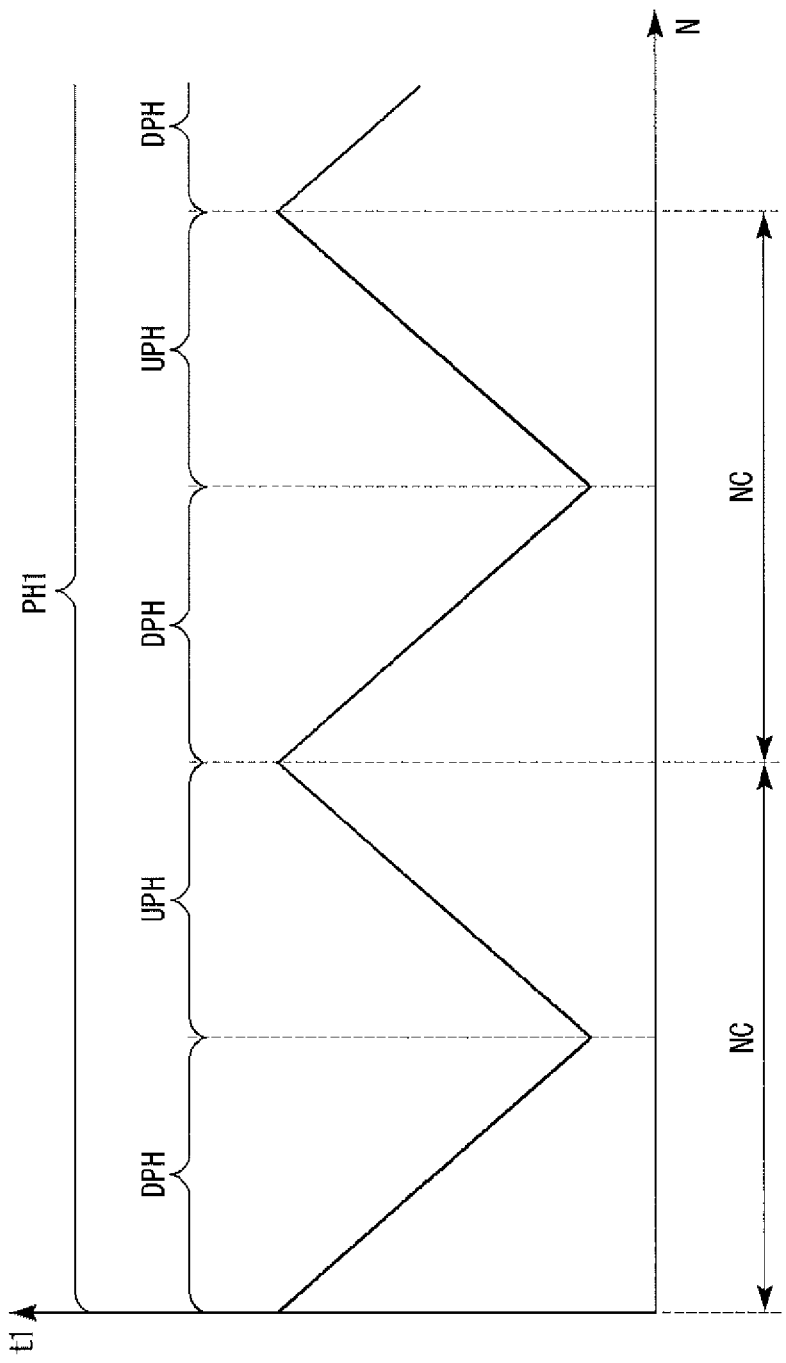
FIG. 11 is a graph showing an example of a change in the length of a first period in the first embodiment.

FIG. 11 is a graph showing an example of a change in the length t1 of the first period P1 in this embodiment. In FIG. 11, the ordinate indicates the length t1 of the first period P1 and the abscissa indicates the number of times N the first period P1 is provided. That is, in this embodiment, the length t1 of the first period P1 with respect to the number of times N indicates the length t1 of the first period P1 provided for the N-th time in the mixed period PH1.

As shown in FIG. 11, the decrease period DPH and the increase period UPH are alternately provided in the mixed period PH1. That is, in this embodiment, the control section 40 changes the length t1 of the first period P1 to repeat an increase and a decrease. In the decrease period DPH and the increase period UPH, a relation between the length t1 of the first period P1 and the number of times N the first period P1 is provided is represented by, for example, a linear function.

In the example shown in FIG. 11, the decrease period DPH and the increase period UPH are switched every time the first period P1 is provided a predetermined number of times. The number of times of the first period P1 in which the decrease period DPH and the increase period UPH are switched may be fixed or may change. A waveform indicating the length t1 of the first period P1 in FIG. 11 is, for example, a triangular wave, a cycle of which is fixed.

A maximum and a minimum of the length t1 of the first period P1 during the repetition of the decrease period DPH and the increase period UPH may be respectively fixed or may respectively change. Further, one of the maximum and the minimum of the length t1 of the first period P1 may be fixed and the other may change.

In this embodiment, the length t1 of the first period P1, that is, a total length of lengths t11 to t14 changes, for example, within a range of length equal to or larger than 10 ms (milliseconds) and equal to or smaller than 10 s (seconds). Since the length t1 of the first period P1 changes within such a range, it is possible to suitably change a heat load applied to the protrusion 552p of the first electrode 92 and the protrusion 562p of the second electrode 93.

In this embodiment, the control section 40 changes, for example, the respective lengths t11 to t14 of the first AC period P11 to the fourth AC period P14. Consequently, the control section 40 changes the length t1 of the first period P1.

As shown in FIG. 8, in this embodiment, the length t11 of the first AC period P11, the length t12 of the second AC period P12, the length t13 of the third AC period P13, and the length t14 of the fourth AC period P14 are, for example, the same. That is, in this embodiment, in changing the length t1 of the first period P1, the control section 40 increases or decreases the respective lengths of the AC periods by the same amount.

A frequency T1 of the alternating currents included in the AC periods is set, for example, on the basis of both of the lamp voltage Vla and the driving power Wd. In this embodiment, the frequency T1 of the alternating currents included in the AC periods is set, for example, on the basis of the first frequency f1 set on the basis of both of the lamp voltage Vla and the driving power Wd.

That is, a frequency T11 in the first AC period P11 is set on the basis of the first frequency f11. A frequency T12 in the second AC period P12 is set on the basis of the first frequency f12. A frequency T13 in the third AC period P13 is set on the basis of the first frequency f13. A frequency T14 in the fourth AC period P14 is set on the basis of the first frequency f14. Specifically, for example, a value obtained by multiplying the lengths of the periods with the first frequencies f1 is the frequency T1.

The second period P2 is a period in which a direct current is supplied to the discharge lamp 90. In the example shown in FIG. 8, in the second period P2, the driving current I having the first polarity and a fixed current value Im1 is supplied to the discharge lamp 90. The polarity of the direct current supplied to the discharge lamp 90 in the second period P2 of the mixed period PH1 is inverted every time the second period P2 is provided.

That is, in the mixed period PH1 shown in FIG. 7, polarities are different from each other in the direct current in the second period P2 provided immediately before the first period P1 and the direct current in the second period P2 provided immediately after the first period P1. For example, when the polarity of the direct current in the second period P2 provided immediately before the first period P1 is the first polarity like the direct current in the second period P2 shown in FIG. 8, the polarity of the direct current in the second period P2 provided immediately after the first period P1 is the second polarity opposite to the first polarity. In this case, in the second period P2 provided immediately after the first period P1, the driving current I having the second polarity and a fixed current value −Im1 is supplied to the discharge lamp 90.

Length t2 of the second period P2 shown in FIG. 8 is larger than the length of a half cycle of an alternating current having the first frequency f11 in the first period P1. The length t2 of the second period P2 is, for example, equal to or larger than 10 ms (milliseconds) and equal to or smaller than 20 ms (milliseconds). Since the length t2 of the second period P2 is set in this way, it is possible to suitably apply a heat load to the protrusion 552p of the first electrode 92.

In this embodiment, the control section 40 sets the length t2 of the second period P2 on the basis of both of the lamp voltage Vla and the driving power Wd. That is, in this embodiment, the control section 40 sets the length t2 of the second period P2 on the basis of at least one of the lamp voltage Vla and the driving power Wd. In other words, in this embodiment, the control section 40 changes the length t2 of the second period P2 on the basis of at least one of the lamp voltage Vla and the driving power Wd. For example, the length t2 of the second period P2 is set larger as the lamp voltage Vla is higher. For example, the length t2 of the second period P2 is set smaller as the driving power Wd is larger (increases).

When the driving power Wd is fixed, a relation between the length t2 of the second period P2 and the lamp voltage Vla is represented by, for example, a linear function. When the lamp voltage Vla is fixed, a relation between the length t2 of the second period P2 and the driving power Wd is represented by, for example, a linear function.

Note that, in this specification, "the length t2 of the second period P2 is set larger as the lamp voltage Vla is higher (increases)" may be only within a predetermined range of a value of the lamp voltage Vla or may be within all ranges that the value of the lamp voltage Vla can take.

In this specification, "the length t2 of the second period P2 is set smaller as the driving power Wd is larger (increases)", may be only within a predetermined range of a value of the driving power Wd or may be within all ranges that the value of the driving power Wd can take.

That is, when the lamp voltage Vla is equal to or smaller than a predetermined value, for example, the length t2 of the second period P2 may be fixed. When the driving power Wd is equal to or smaller than a predetermined value, for example, the length t2 of the second period P2 may be fixed.

In this specification, "the length t2 of the second period P2 is set larger as the lamp voltage Vla is higher (increases)" includes such setting at the time when the driving power Wd is fixed. In this specification, "the length t2 of the second period P2 is set smaller as the driving power Wd is larger (increases)" includes such setting at the time when the lamp voltage Vla is fixed.

That is, for example, when the length t2 of the second period P2 is set on the basis of both of the lamp voltage Vla and the driving power Wd as in this embodiment, the length t2 of the second period P2 to be provided sometimes decreases because the driving power Wd increases even when the lamp voltage Vla increases. The length t2 of the second period P2 to be provided sometimes increases because the lamp voltage Vla decreases even when the driving power Wd increases.

The control by the control section 40 can be represented as a discharge lamp driving method as well. That is, a form of the discharge lamp driving method according to this embodiment is a discharge lamp driving method for supplying the driving current I to the discharge lamp 90 including the first electrode 92 and the second electrode 93 and driving the discharge lamp 90, the discharge lamp driving method including supplying, to the discharge lamp 90, the driving current I including the mixed period PH1 in which the first period P1 and the second period P2 are alternately repeated. An alternating current having the first frequency f1 is supplied to the discharge lamp 90 in the first period P1 and a direct current is supplied to the discharge lamp 90 in the second period P2. The first frequency f1 includes a plurality of frequencies different from one another. The discharge lamp driving method temporally changes the length t1 of the first period P1.

According to this embodiment, the control section 40 temporally changes the length t1 of the first period P1. Therefore, an interval of the second period P2 provided in the mixed period PH1 changes according to the change in the length t1 of the first period P1. In other words, the number of times the second period P2 is provided within a predetermined time period (the density of the second periods P2) temporally changes. In the second period P2, a heat load applied to the first electrode 92 is large compared with the heat load in the first period P1 because the direct current is supplied to the discharge lamp 90. Consequently, the heat load applied to the first electrode 92 within a predetermined time period temporally changes. Therefore, a stimulus due to the heat load applied to the first electrode 92 temporally changes to easily grow the protrusion 552p of the first electrode 92. As a result, according to this embodiment, even when the discharge lamp 90 is deteriorated, it is easy to grow the protrusion 552p. It is possible to improve the life of the discharge lamp 90.

According to this embodiment, the first frequency f1 includes a plurality of frequencies different from one another. Therefore, it is possible to vary the heat load applied to the first electrode 92 within the first period P1. Therefore, according to this embodiment, it is easier to grow the protrusion 552p of the first electrode 92.

According to this embodiment, the control section 40 changes the length t1 of the first period P1 to repeat an increase and a decrease. Therefore, the number of times the second period P2 is provided within a predetermined time period changes while alternately repeating an increase and a decrease. Consequently, the stimulus due to the heat load applied to the first electrode 92 changes while alternately repeating an increase and a decrease. Therefore, according to this embodiment, it is easier to grow the protrusion 552p of the first electrode 92.

According to this embodiment, the control section 40 changes the respective lengths t11 to t14 of the first AC period P11 to the fourth AC period P14. Therefore, it is easy to change the length t1 of the first period P1 compared with when only the length of a part of the plurality of AC periods is changed. Since it is possible to adopt a configuration in which the lengths t11 to t14 of the first AC period P11 to the fourth AC period P14 are the same, control of the discharge lamp driving section 230 is simple.

For example, when the discharge lamp 90 is deteriorated and the lamp voltage Vla increases, the driving current I supplied to the discharge lamp 90 decreases. Therefore, a bright spot of arc discharge easily becomes unstable and easily moves. When the bright spot of the arc discharge moves, a melting position and a melting amount in the first electrode 92 change. Consequently, it is likely that the shape of the first electrode 92 becomes unstable and easily wears.

Therefore, it is likely that the life of the discharge lamp 90 cannot be sufficiently improved.

Similarly, when the driving power Wd is small, the driving current I decreases. Therefore, it is likely that the bright spot of the arc discharge becomes unstable and the first electrode 92 easily wears. Therefore, it is likely that the life of the discharge lamp 90 cannot be sufficiently improved.

As measures against these problems, according to this embodiment, the control section 40 sets the first frequency f1 on the basis of at least one of the lamp voltage Vla and the driving power Wd. Therefore, it is possible to solve at least one of the problems.

Specifically, when the first frequency f1 is set on the basis of the lamp voltage Vla, the first frequency f1 is set higher as the lamp voltage Vla is higher. Consequently, when the discharge lamp 90 is deteriorated, it is easy to stabilize the bright spot of the arc discharge. A reason for this is as explained below.

When a frequency of an alternating current supplied to the discharge lamp 90 is relatively high, a volume of a portion to be melted in the protrusion 552p of the first electrode 92 is relatively small. The bright spot of the arc discharge is located on a melted and planarized distal end face of the protrusion 552p. When the volume of the portion to be melted in the protrusion 552p is small, the area of the planarized distal end face is relatively small. Therefore, a region where the bright spot of the arc discharge moves decreases. It is possible to stabilize the position of the bright spot of the arc discharge. Therefore, according to this embodiment, when the discharge lamp 90 is deteriorated, it is possible to suppress the first electrode 92 from wearing.

On the other hand, when the first frequency f1 is set on the basis of the driving power Wd, by setting the first frequency f1 higher as the driving power Wd is smaller, it is possible to set the first frequency f1 relatively high when the driving power Wd is relatively small. Consequently, it is possible to stabilize the bright spot of the arc discharge and suppress the first electrode 92 from easily wearing in the same manner as explained above. As explained above, according to this embodiment, it is possible to suppress the first electrode 92 from wearing and further improve the life of the discharge lamp 90.

According to this embodiment, since the first frequency f1 is set on the basis of both of the lamp voltage Vla and the driving power Wd, it is possible to solve both the problems. Therefore, it is possible to further improve the life of the discharge lamp 90.

According to this embodiment, in the first period P1, the first frequency f1 is lower in the AC period provided temporally later. That is, in the first period P1, the first frequency f1 is the highest in the first AC period P11 provided earliest temporally. In other words, in the first frequency f1, the first frequency f11 of the alternating current supplied to the discharge lamp 90 in the first AC period P11 is the largest. As the frequency of the alternating current supplied to the discharge lamp 90 is higher, the temperature of the first electrode 92 more easily drops.

Therefore, in the mixed period PH1, the first AC period P11 in which the first frequency f1 is high is provided immediately after the second period P2 in which the heat load is larger than the heat load in the first period P1. Consequently, it is easy to suddenly drop the temperature of the first electrode 92 heated in the second period P2. It is easy to apply the stimulus due to fluctuation in the heat load to the first electrode 92. As a result, according to this embodiment, it is easier to grow the protrusion 552p.

According to this embodiment, the control section 40 sets the length t2 of the second period P2 on the basis of at least one of the lamp voltage Vla and the driving power Wd. Therefore, by setting the length t2 of the second period P2 larger as the lamp voltage Vla is higher, when the discharge lamp 90 is deteriorated, it is easy to suitably melt the protrusion 552p and it is easy to maintain the shape of the protrusion 552p. By setting the length t2 of the second period P2 smaller as the driving power Wd is larger, it is possible to suppress the protrusion 552p of the first electrode 92 from being excessively melted. It is easy to maintain the shape of the protrusion 552p.

According to this embodiment, the polarity of the direct current supplied to the discharge lamp 90 in the second period P2 of the mixed period PH1 is inverted every time the second period P2 is provided. Therefore, in the mixed period PH1, it is possible to grow the protrusion 552p of the first electrode 92 and the protrusion 562p of the second electrode 93 in a well-balanced state. It is easy to maintain both of the shape of the protrusion 552p and the shape of the protrusion 562p.

Note that, in this embodiment, it is also possible to adopt configurations and methods explained below.

In this embodiment, the lengths of the AC periods included in the first period P1 may change any way as long as the length t1 of the first period P1 temporally changes. In this embodiment, it is also possible that only the length of a part of the plurality of AC periods changes and the lengths of the other AC periods of the plurality of AC periods do not change.

In this embodiment, a pattern of the change in the length t1 of the first period P1 is not particularly limited as long as the length t1 of the first period P1 temporally changes. In this embodiment, the length t1 of the first period P1 may monotonously increase or monotonously decrease in the mixed period PH1.

In this embodiment, when a plurality of mixed periods PH1 are discontinuously provided, the pattern of the change in the length t1 of the first period P1 may change, for example, every time the mixed period PH1 is provided. Specifically, for example, when the length t1 of the first period P1 monotonously decreases in one mixed period PH1, the length t1 of the first period P1 may monotonously increase in the mixed period PH1 provided next.

Second Embodiment

A second embodiment is different from the first embodiment in that a cycle NC of a change in the length t1 of the first period P1 is changed. Note that explanation of components same as the components in the first embodiment is sometimes omitted by, for example, denoting the components with the same reference numerals and signs as appropriate.

In this embodiment, as shown in FIG. 11, the control section 40 cyclically changes the length t1 of the first period P1. More specifically, in this embodiment, the control section 40 cyclically changes the length t1 of the first period P1 to repeat an increase and a decrease. In this embodiment, for example, the control section 40 cyclically changes the respective lengths t11 to t14 of the first AC period P11 to the fourth AC period P14. Consequently, the control section 40 changes the length t1 of the first period P1.

The cycle NC of the change in the length t1 of the first period P1 shown in FIG. 11 changes on the basis of at least one of the lamp voltage Vla and the driving power Wd. That is, the control section 40 changes the cycle NC of the change in the length t1 of the first period P1 on the basis of at least one of the lamp voltage Vla detected by the voltage detecting section of the operation detecting section 60 and the driving power Wd supplied to the discharge lamp 90. In this embodiment, the control section 40 changes the cycle NC on the basis of both of the lamp voltage Vla and the driving power Wd. In the example shown in FIG. 11, the cycle NC is time from a start of the decrease period DPH to a start of the next decrease period DPH across the increase period UPH.

Figure 12:
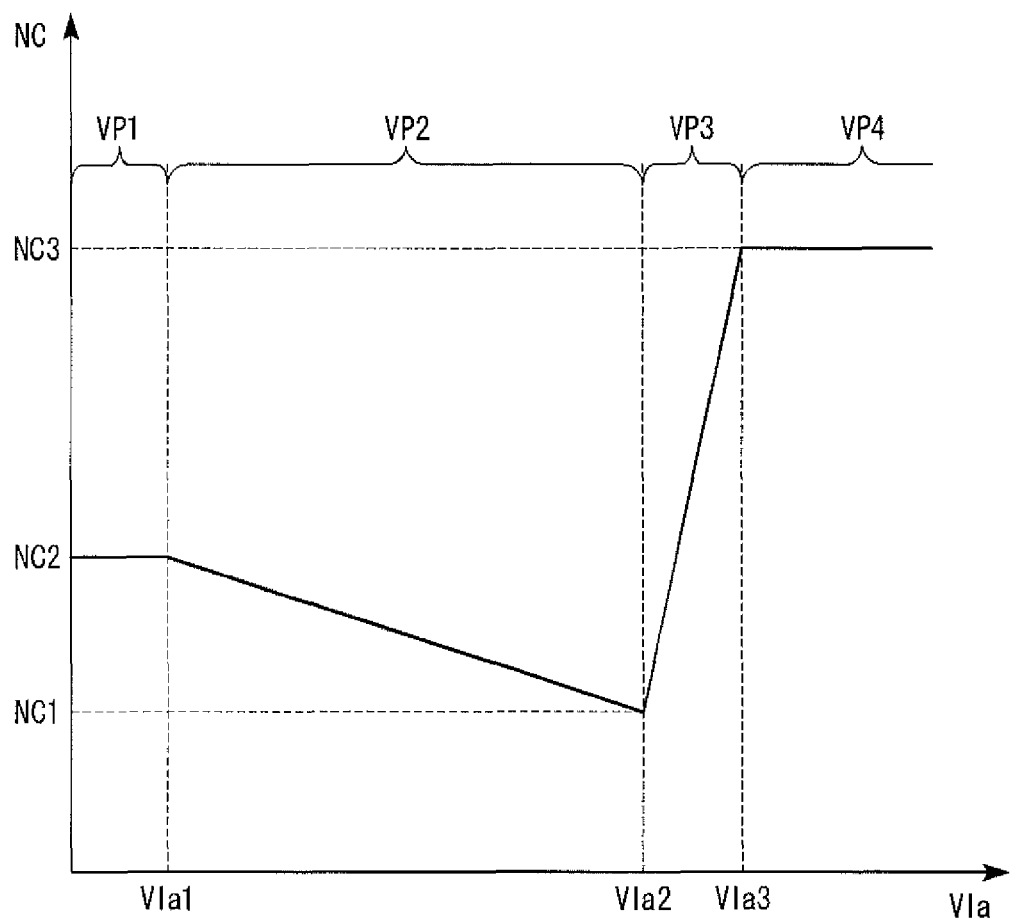
FIG. 12 is a graph showing an example of a relation between a cycle of a change in the length of a first period and a lamp voltage in a second embodiment.

FIG. 12 is a graph showing an example of a relation between the cycle NC of the change in the length t1 of the first period P1 and the lamp voltage Vla. In FIG. 12, the ordinate indicates the cycle NC and the abscissa indicates the lamp voltage Vla. FIG. 12 shows a relation between the cycle NC and the lamp voltage Vla at the time when the driving power Wd is a fixed value.

As shown in FIG. 12, a waveform of the cycle NC with respect to the lamp voltage Vla includes a first section VP1, a second section VP2, a third section VP3, and a fourth section VP4 according to ranges of the lamp voltage Vla.

The first section VP1 is a section in which the lamp voltage Vla is equal to or lower than a first voltage Vla1. In the first section VP1, a value of the cycle NC is fixed at NC2.

That is, in this embodiment, when the detected lamp voltage Vla is equal to or lower than the first voltage Vla1, the control section 40 maintains the cycle NC fixed. As an example, when the driving power Wd is 200 W, the first voltage Vla1 is 70 V.

The second section VP2 is a section in which the lamp voltage Vla is higher than the first voltage Vla1 and equal to or lower than a second voltage Vla2 higher than the first voltage Vla1. In the second section VP2, a value of the cycle NC is smaller as the lamp voltage Vla is higher. That is, in this embodiment, when the detected lamp voltage Vla is higher than the first voltage Vla1, the control section 40 sets the cycle NC shorter as the detected lamp voltage Vla is higher. As an example, when the driving power Wd is 200 W, the second voltage Vla2 is 120 V.

In the example shown in FIG. 12, in the second section VP2, a relation between the cycle NC and the lamp voltage Vla is represented by a linear function. In the second section VP2, a value of the cycle NC decreases from NC2 to NC1 smaller than NC2.

The third section VP3 is a section in which the lamp voltage Vla is higher than the second voltage Vla2 and equal to or lower than a third voltage Vla3 higher than the second voltage Vla2. In the third section VP3, a value of the cycle NC is larger as the lamp voltage Vla is higher. That is, in this embodiment, when the detected lamp voltage Vla is higher than the second voltage Vla2 higher than the first voltage Vla1, the control section 40 sets the cycle NC longer as the detected lamp voltage Vla is higher. As an example, when the driving power Wd is 200 W, the third voltage Vla3 is 130 V.

In the example shown in FIG. 12, in the third section VP3, a relation between the cycle NC and the lamp voltage Vla is represented by a linear function. The absolute value of a tilt of the cycle NC in the third section VP3 is larger than the absolute value of a tilt of the cycle NC in the second section VP2. In the third section VP3, a value of the cycle NC increases from NC1 to NC3.

The fourth section VP4 is a section in which the lamp voltage Vla is higher than the third voltage Vla3. In the fourth section VP4, a value of the cycle NC is fixed at NC3. That is, in this embodiment, when the detected lamp voltage Vla is higher than the third voltage Vla3 higher than the second voltage Vla2, the control section 40 maintains the cycle NC fixed. The value NC3 of the cycle NC maintained in the fourth section VP4 is larger than the value NC2 of the cycle NC maintained in the first section VP1.

Figure 13:
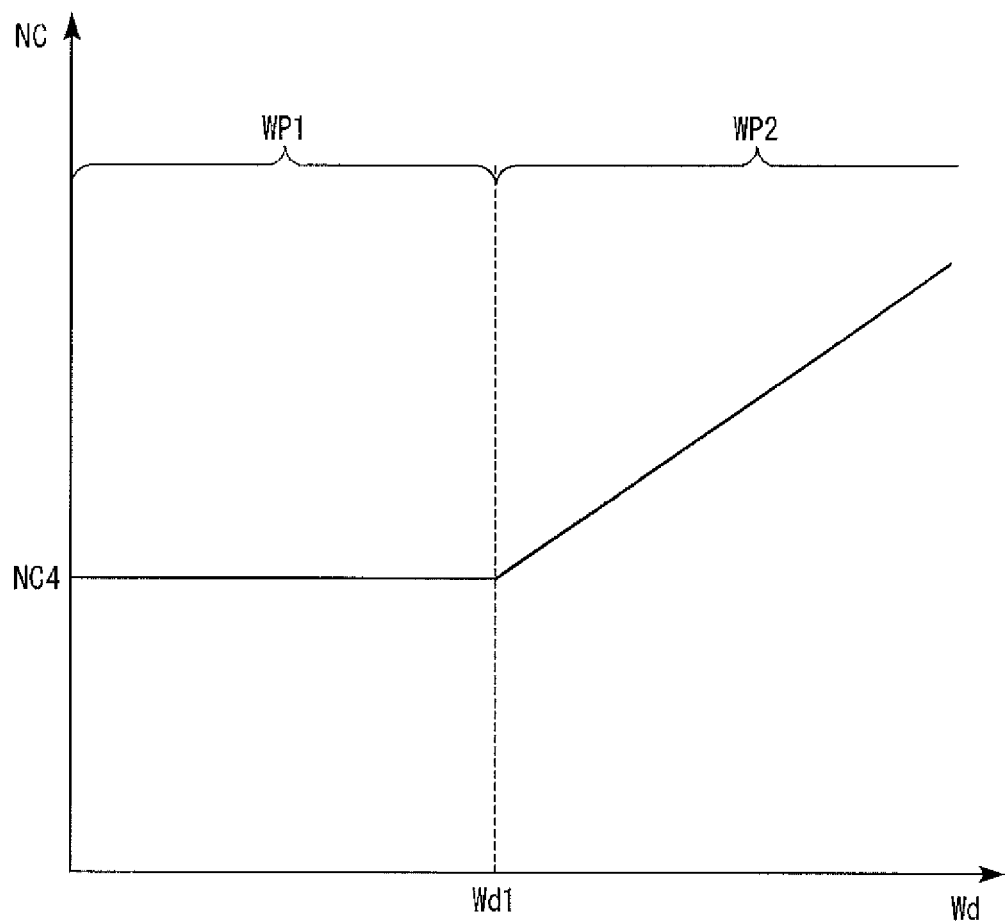
FIG. 13 is a graph showing an example of a relation between the cycle of the change in the length of the first period and driving power in the second embodiment.

FIG. 13 is a graph showing an example of a relation between the cycle NC of the change in the length t1 of the first period P1 and the driving power Wd in this embodiment. In FIG. 13, the ordinate indicates the cycle NC and the abscissa indicates the driving power Wd. FIG. 13 shows a relation between the cycle NC and the driving power Wd at the time when the lamp voltage Vla is a fixed value.

As shown in FIG. 13, a waveform of the cycle NC with respect to the driving power Wd includes a first section WP1 and a second section WP2 according to ranges of the driving power Wd.

The first section WP1 is a section in which the driving power Wd is equal to or smaller than first driving power Wd1. In the first section WP1, a value of the cycle NC is fixed at NC4. That is, in this embodiment, the control section 40 maintains the cycle NC fixed when the driving power Wd is equal to or smaller than the first driving power Wd1. As an example, when the lamp voltage Vla is 70 V, the first driving power Wd1 is 130 W.

The second section WP2 is a section in which the driving power Wd is larger than the first driving power Wd1. In the second section WP2, a value of the cycle NC is larger as the driving power Wd is larger. That is, in this embodiment, when the driving power Wd is larger than the first driving power Wd1, the control section 40 sets the cycle NC longer as the driving power Wd is larger.

Note that, in this specification, "when the lamp voltage Vla is higher than the first voltage Vla1, the control section 40 sets the cycle NC shorter as the lamp voltage Vla is higher (increases)" may be only within a part (the second section VP2) of a range in which the lamp voltage Vla is higher than the first voltage Vla1 as in the example shown in FIG. 12 or may be the entire range in which the lamp voltage Vla is higher than the first voltage Vla1.

In this specification, "when the lamp voltage Vla is higher than the second voltage Vla2, the control section 40 sets the cycle NC longer as the lamp voltage Vla is higher (increases)" may be only within a part (the third section VP3) of a range in which the lamp voltage Vla is higher than the second voltage Vla2 as in the example shown in FIG. 12 or may be in the entire range in which the lamp voltage Vla is higher than the second voltage Vla2.

In this specification, "when the driving power Wd is larger than the first driving power Wd1, the control section 40 sets the cycle NC longer as the driving power Wd is larger (increases)" may be in an entire range in which the driving power Wd is larger than the first driving power Wd1 as in the example shown in FIG. 13 or may be within a part of the range in which the driving power Wd is larger than the first driving power Wd1.

In this specification, "the cycle NC is shorter as the lamp voltage Vla is higher (increases)" and "the cycle NC is longer as the lamp voltage Vla is higher (increases)" include the cycle NC at the time when the driving power Wd is fixed. In this specification, "the cycle NC is longer as the driving power Wd is larger (increases)" includes the cycle NC at the time when the lamp voltage Vla is fixed.

That is, for example, when the cycle NC changes on the basis of both of the lamp voltage Vla and the driving power Wd as in this embodiment, an actual cycle NC sometimes increases because the driving power Wd increases even when the lamp voltage Vla increases between the first voltage Vla1 and the second voltage Vla2.

Other configurations and other control methods by the control section 40 in this embodiment are the same as those in the first embodiment.

The control by the control section 40 explained above can be represented as a discharge lamp driving method. That is, a form of the discharge lamp driving method according to this embodiment is a discharge lamp driving method for supplying the driving current I to the discharge lamp 90 including the first electrode 92 and the second electrode 93 and driving the discharge lamp 90, the discharge lamp driving method including supplying, to the discharge lamp 90, the driving current I including the mixed period PH1 in which the first period P1 and the second period P2 are alternately repeated. An alternating current having the first frequency f1 is supplied to the discharge lamp 90 in the first period P1 and a direct current is supplied to the discharge lamp 90 in the second period P2. The first frequency f1 includes a plurality of frequencies different from one another. The discharge lamp driving method cyclically changes the length t1 of the first period P1 and changes the cycle NC of the change in the length t1 of the first period P1.

According to this embodiment, the control section 40 cyclically changes the length t1 of the first period P1. Therefore, an interval of the second period P2 provided in the mixed period PH1 cyclically changes according to the change in the length t1 of the first period P1. In other words, the number of times the second period P2 is provided within a predetermined time period (the density of the second periods P2) cyclically changes. In the second period P2, since the direct current flows to the discharge lamp 90, a heat load applied to the first electrode 92 is large compared with the heat load in the first period P1. Consequently, the heat load applied to the first electrode 92 within a predetermined time period cyclically changes. Therefore, a stimulus due to the heat load applied to the first electrode 92 cyclically changes to easily grow the protrusion 552p of the first electrode 92. As a result, according to this embodiment, even when the discharge lamp 90 is deteriorated, it is easy to grow the protrusion 552p. It is possible to improve the life of the discharge lamp 90.

For example, when the deterioration of the discharge lamp 90 progresses a certain degree, the protrusion 552p of the first electrode 92 less easily grows. Therefore, even if the length t1 of the first period P1 is simply cyclically changed, it is possible that the protrusion 552p cannot be sufficiently grown.

For example, when the driving power Wd is relatively large, the heat load applied to the first electrode 92 easily increases. Therefore, when the length t1 of the first period P1 is changed at the cycle NC same as the cycle NC at the time when the driving power Wd is relatively small, it is possible that the heat load applied to the first electrode 92 excessively increases and the protrusion 552p of the first electrode 92 is excessively melted.

As measures against these problems, according to this embodiment, the control section 40 changes the cycle NC of the change in the length t1 of the first period P1 on the basis of at least one of the lamp voltage Vla and the driving power Wd. Therefore, it is possible to solve at least one of the problems. This is explained in detail below.

When the cycle NC of the change in the length t1 of the first period P1 decreases, an interval for providing a period in which the length t1 of the first period P1 is relatively large and a period in which the length t1 of the first period P1 is relatively small decreases. Therefore, the change in the interval of the second period P2 provided in the mixed period PH1 fluctuates in a relatively short time and the stimulus due to the heat load applied to the first electrode 92 increases. Therefore, for example, when the discharge lamp 90 is deteriorated and the lamp voltage Vla increases, by reducing the cycle NC, it is possible to increase the stimulus due to the heat load applied to the first electrode 92 and facilitate the growth of the protrusion 552p of the first electrode 92.

On the other hand, when the cycle NC of the change in the length t1 of the first period P1 increases, the interval for providing the period in which the length t1 of the first period P1 is relatively large and the period in which the length t1 of the first period P1 is relatively small increases. Therefore, the change in the interval of the second period P2 provided in the mixed period PH1 fluctuates in a relatively long time and the stimulus due to the heat load applied to the first electrode 92 decreases. Therefore, for example, when the driving power Wd increases, by increasing the cycle NC, it is possible to reduce the stimulus due to the heat load applied to the first electrode 92 and suppress the protrusion 552p of the first electrode 92 from being excessively melted.

As explained above, according to this embodiment, it is possible to solve at least a part of the problem and further improve the life of the discharge lamp 90. In this embodiment, the control section 40 changes the cycle NC on the basis of both of the lamp voltage Vla and the driving power Wd. Therefore, it is possible to solve both of the problems and further improve the life of the discharge lamp 90.

According to this embodiment, when the lamp voltage Vla is higher than the first voltage Vla1, the control section 40 sets the cycle NC shorter as the lamp voltage Vla is higher. Therefore, as the discharge lamp 90 is deteriorated more and the protrusion 552p of the first electrode 92 less easily grows, it is possible to increase the stimulus due to the heat load applied to the first electrode 92. Consequently, even when the discharge lamp 90 is deteriorated, it is possible to suitably grow the protrusion 552p of the first electrode 92. For example, when the deterioration of the discharge lamp 90 progresses a certain degree or more, even if the heat load is applied to the first electrode 92 to melt the protrusion 552p of the first electrode 92, the protrusion 552p less easily grows. In this case, if the stimulus due to the heat load applied to the first electrode 92 is increased, it is likely that the first electrode 92 wears and the deterioration of the discharge lamp 90 is accelerated to the contrary.

On the other hand, according to this embodiment, when the lamp voltage Vla is higher than the second voltage Vla2 higher than the first voltage Vla1, the control section 40 sets the cycle NC longer as the lamp voltage Vla is higher. Therefore, when the deterioration of the discharge lamp 90 progresses a certain degree or more, it is possible to reduce the stimulus due to the heat load applied to the first electrode 92. Therefore, when the deterioration of the discharge lamp 90 progresses the certain degree or more, it is possible to suppress the deterioration of the discharge lamp 90 from being accelerated.

According to this embodiment, when the lamp voltage Vla is equal to or lower than the first voltage Vla1, the control section 40 maintains the cycle NC fixed. Therefore, when the discharge lamp 90 is not deteriorated or when a deterioration degree of the discharge lamp 90 is relatively small, it is unnecessary to change the cycle NC. It is possible to simplify the control of the discharge lamp driving section 230. When the discharge lamp 90 is not deteriorated or when the deterioration degree of the discharge lamp 90 is relatively small, the protrusion 552p of the first electrode 92 relatively easily grows. Therefore, even if the cycle NC is fixed, it is possible to sufficiently grow the protrusion 552p.

According to this embodiment, when the driving power Wd is larger than the first driving power Wd1, the control section 40 sets the cycle NC longer as the driving power Wd is larger. Therefore, as the driving power Wd is larger and the heat load applied to the first electrode 92 is larger, it is possible to set, with the change of the cycle NC, the stimulus due to the heat load applied to the first electrode 92 smaller. Consequently, when the driving power Wd is large, it is possible to suppress the protrusion 552p of the first electrode 92 from being excessively melted.

According to this embodiment, when the driving power Wd is equal to or smaller than the first driving power Wd1, the control section 40 maintains the cycle NC fixed. Therefore, it is unnecessary to change the cycle NC when the driving power Wd is relatively small. It is possible to simplify the control of the discharge lamp driving section 230. When the driving power Wd is relatively small, the heat load applied to the first electrode 92 is relatively small. Therefore, even if the cycle NC is fixed, it is possible to suppress the protrusion 552p from being excessively melted.

According to this embodiment, the first frequency f1 includes the plurality of frequencies different from one another. Therefore, it is possible to vary the heat load applied to the first electrode 92 within the first period P. Therefore, according to this embodiment, it is easier to grow the protrusion 552p of the first electrode 92.

According to this embodiment, the control section 40 cyclically changes the length t1 of the first period P1 to repeat an increase and a decrease. Therefore, the number of times the second period P2 is provided within the predetermined time period changes while alternately repeating an increase and a decrease. Consequently, the stimulus due to the heat load applied to the first electrode 92 changes while alternately repeating an increase and a decrease. Therefore, according to this embodiment, it is easier to grow the protrusion 552p of the first electrode 92.

According to this embodiment, the control section 40 cyclically changes the respective lengths t11 to t14 of the first AC period P11 to the fourth AC period P14. Therefore, compared with when only the length of a part of the plurality of AC periods is changed, it is easier to change the length t1 of the first period P1. Since it is possible to adopt a configuration in which the lengths t11 to t14 of the first AC period P11 to the fourth AC period P14 are the same, the control of the discharge lamp driving section 230 is easy. Note that, in this embodiment, it is also possible to adopt configurations and methods explained below.

In this embodiment, the lengths of the AC periods included in the first period P1 may change in any way as long as the length t1 of the first period P1 cyclically changes. In this embodiment, it is also possible that only the length of a part of the plurality of AC periods changes and the lengths of the other AC periods of the plurality of AC periods do not change.

In this embodiment, a pattern of the change in the length t1 of the first period P1 is not particularly limited as long as the length t1 of the first period P1 cyclically changes. In this embodiment, a fixed pattern for repeating an increase and a decrease in the length t1 of the first period P1 a plurality of times may be cyclically repeated.

In this embodiment, when a plurality of mixed periods PH1 are discontinuously provided, the pattern of the change in the length t1 of the first period P1 may change, for example, every time the mixed period PH1 is provided.

In this embodiment, the change of the cycle NC is not particularly limited as long as the change of the cycle NC is performed on the basis of at least one of the lamp voltage Vla and the driving power Wd. For example, in this embodiment, when the lamp voltage Vla is higher than the first voltage Vla1, the control section 40 may set the cycle NC shorter than the cycle NC at the time when the lamp voltage Vla is equal to or lower than the first voltage Vla1.

In this case, specifically, for example, in FIG. 12, the control section 40 sets a value of the cycle NC in the second section VP2 smaller than the value NC2 of the cycle NC in the first section VP1. In this case, the value of the cycle NC in the second section VP2 only has to be smaller than NC2. For example, within the second section VP2, the value of the cycle NC in the second section VP2 may be increased or decreased or may be maintained fixed at a value smaller than NC2.

For example, in this embodiment, when the lamp voltage Vla is higher than the second voltage Vla2, the control section 40 may set the cycle NC longer than the cycle NC at the time when the lamp voltage Vla is the second voltage Vla2.

In this case, specifically, for example, in FIG. 12, the control section 40 sets a value of the cycle NC in the third section VP3 larger than the value NC1 of the cycle NC at the time when the lamp voltage Vla is the second voltage Vla2. In this case, the value of the cycle NC in the third section VP3 only has to be larger than NC1. For example, within the third section VP3, the value of the cycle NC in the third section VP3 may be increased or decreased or may be maintained fixed at a value larger than NC1.

For example, in this embodiment, when the driving power Wd is larger than the first driving power Wd1, the control section 40 may set the cycle NC longer than the cycle NC at the time when the driving power Wd is equal to or smaller than the first driving power Wd1.

In this case, specifically, for example, in FIG. 13, the control section 40 sets a value of the cycle NC in the second section WP2 larger than the value NC4 of the cycle NC in the first section WP1. In this case, the value of the cycle NC in the second section WP2 only has to be larger than NC4. For example, within the second section WP2, the value of the cycle NC in the second section WP2 may be increased or decreased or may be maintained fixed at a value larger than NC4.

In this embodiment, the control section 40 may set the cycle NC shorter as the lamp voltage Vla is higher within all ranges that the value of the lamp voltage Vla can take. In this embodiment, the control section 40 may set the cycle NC longer as the driving power Wd is larger within all ranges that the value of the driving power Wd can take. In this embodiment, the control section 40 may change the cycle NC on the basis of only the lamp voltage Vla or may change the cycle NC on the basis of only the driving power Wd.

Note that, in the first embodiment and the second embodiment explained above, it is also possible to adopt configurations and methods explained below.

In the embodiments, the mixed period PH1 may be always provided while the discharge lamp 90 is lit or a plurality of mixed periods PH1 may be discontinuously provided across other periods.

In the above explanation, the length t1 of the first period P1 changes every time the first period P1 is provided. However, the invention is not limited to this. In the embodiments, for example, the length t1 of the first period P1 may change every time a plurality of first periods P1 are provided. In this case, after the plurality of first periods P1 having the same length t1 are provided across the second periods P2, the length t1 of the first period P1 changes.

In the embodiments, a change in the length t1 of the first period P1 in the decrease period DPH is not particularly limited as long as the length t1 of the first period P1 decreases in the decrease period DPH as a whole. In the embodiments, the length t1 of the first period P1 in the decrease period DPH may change in a quadratic function manner, may change stepwise, or may irregularly change.

Note that, in this specification, "the length t1 of the first period P1 decreases in the decrease period DPH as a whole" includes, within one decrease period DPH, the length t1 of the first period P1 not increasing and the length t1 of the last first period P1 being smaller than the length t1 of the initial first period P1.

In the embodiments, a change in the length t1 of the first period P1 in the increase period UPH is not particularly limited as long as the length t1 of the first period P1 increases in the increase period UPH as a whole. In the embodiments, the length t1 of the first period P1 in the increase period UPH may change in a quadratic function manner, may change stepwise, or may irregularly change.

Note that, in this specification, "the length t1 of the first period P1 increases in the increase period UPH as a whole" includes, within one increase period UPH, the length t1 of the first period P1 not decreasing and the length t1 of the last first period P1 being larger than the length t1 of the initial first period P1.

In the embodiments, the lengths of the AC periods included in the first period P1 may be different from one another. That is, the length t11 of the first AC period P11, the length t12 of the second AC period P12, the length t13 of the third AC period P13, and the length t14 of the fourth AC period P14 may be different from one another.

In the embodiments, when only the length of a part of the plurality of AC periods is changed, for example, a configuration may be adopted in which the length of the AC period having the highest frequency among the plurality of AC periods, that is, in the example shown in FIG. 8, only the length t11 of the first AC period P11 is changed. In this case, as the length t1 of the first period P1 is larger, a ratio of a period in which a high-frequency alternating current is supplied to the discharge lamp 90 in the first period P1 is larger. As the length t1 of the first period P1 is smaller, the ratio of the period in which the high-frequency alternating current is supplied to the discharge lamp 90 in the first period P1 is smaller.

The heat load applied to the first electrode 92 increases as the frequency of the alternating current supplied to the discharge lamp 90 is lower. Therefore, if only the length t11 of the first AC period P11 is changed, when the length t1 of the first period P1 increases and the number of times of the second period P2 provided within a predetermined time period decreases, the heat load in the first period P1 decreases and, when the length t1 of the first period P1 decreases and the number of times of the second period P2 provided within the predetermined time period increases, the heat load in the first period P1 increases. Consequently, it is possible to further increase a difference in a change of the stimulus due to the heat load applied to the first electrode 92. It is possible to further grow the protrusion 552p of the first electrode 92.

In the decrease period DPH in the embodiments, if the length t1 of the first period P1 decreases, for example, the length of a part of the AC periods included in the first period P1 may increase. In this case, a decrease width of the lengths of the other AC periods among the AC periods included in the first period P1 is larger than an increase width of the length of a part of the AC periods included in the first period P1. The length t1 of the first period P1 as a whole is small.

In the increase period UPH in the embodiments, if the length t1 of the first period P1 increases, for example, the length of a part of the AC periods included in the first period P1 may decrease. In this case, an increase width of the lengths of the other AC periods among the AC periods included in the first period P1 is larger than a decrease width of the length of a part of the AC periods included in the first period P1. The length t1 of the first period P1 as a whole is large.

In the embodiments, a pattern of a change in the AC periods may temporally change. Specifically, for example, when the length t11 of the first AC period P11 decreases in a certain decrease period DPH, in the other decrease periods DPH, the length t11 of the first AC period P11 does not have to change or may increase.

For example, when the driving power Wd temporally changes, in the embodiments, the first frequency f1 changes according to a change in the driving power Wd. In this case, the lengths t11 to t14 of the first AC period P11 to the fourth AC period P14 may change. However, the length t1 of the entire first period P1 desirably does not change. That is, the length t1 of the first period P1 desirably does not depend on the driving power Wd. This is because, when the length t1 of the first period P1 changes according to the driving power Wd, timing when the second period P2 is provided easily becomes irregular and it is likely that the stimulus due to the thermal load is less easily suitably applied to the first electrode 92.

In the embodiments, a plurality of first frequencies f1 may be provided in any way. In the embodiments, for example, in the first period P1, the first frequency f1 may be larger in the AC period provided temporally later.

In the embodiments, the number of AC periods included in the first period P1 is not particularly limited. In the embodiments, the first period P1 may include two or three AC periods or may include five or more AC periods. In the embodiments, for example, in each of the first periods P1, the number of AC periods included in the first period P1 may be different.

In the embodiments, the control section 40 may set the first frequency f1 on the basis of only the lamp voltage Vla or may set the first frequency f1 on the basis of only the driving power Wd. In the embodiments, the first frequency f1 does not have to change.

In the embodiments, the control section 40 may set the length t2 of the second period P2 on the basis of only the lamp voltage Vla or may set the length t2 of the second period P2 on the basis of only the driving power Wd. In the embodiments, the length t2 of the second period P2 does not have to change.

In the embodiments, the control section 40 may set the length t2 of the second period P2 on the basis of at least one of the lamp voltage Vla and the driving power Wd every time the second period P2 is provided. Alternatively, when a plurality of mixed periods PH1 are provided, the control section 40 may set the length t2 of the second period P2 on the basis of at least one of the lamp voltage Vla and the driving power Wd once every time the mixed period PH1 is provided. When the length t2 of the second period P2 is set every time the second period P2 is provided, the lengths t2 of the second periods P2 are sometimes different from one another in one mixed period PH1. On the other hand, when the length t2 of the second period P2 is set once every time the mixed period PH1 is provided, the lengths t2 of the second periods P2 are the same in one mixed period PH1.

In the embodiments, when the plurality of mixed periods PH1 are provided, the control section 40 may set the length t2 of the second period P2 on the basis of at least one of the lamp voltage Vla and the driving power Wd once every time a predetermined number of mixed periods PH1 are provided.

In the embodiments, the control section 40 does not have to invert, every time the second period P2 is provided, the polarity of the direct current supplied to the discharge lamp 90 in the second period P2 of the mixed period PH. That is, in the embodiments, the second period P2 in which the direct current having the same polarity is supplied to the discharge lamp 90 may be continuously provided twice or more.

Third Embodiment

A third embodiment is different from the first embodiment in that a third period P3 is provided. Note that explanation of components same as the components in the first embodiment is sometimes omitted by, for example, denoting the components with the same reference numerals and signs as appropriate.

In this embodiment, the control section 40 is capable of executing divided DC driving in addition to the respective kinds of driving explained in the first embodiment. In this embodiment, the control section 40 controls the discharge lamp driving section 230 such that the third period P3, which is a period in which the divided DC driving is executed, is provided. The third period P3 is a period provided instead of the second period P2 under a predetermined condition.

Figure 14:
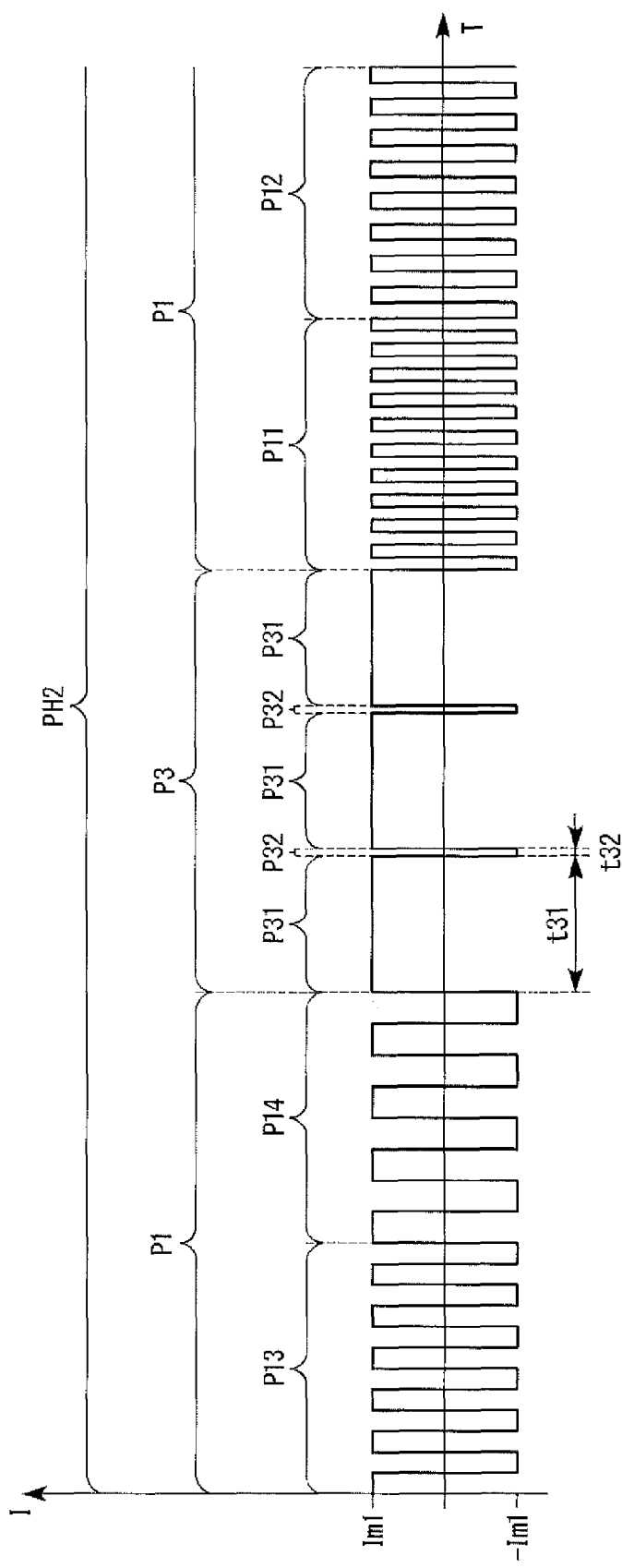
FIG. 14 is a diagram showing an example of a driving current waveform in a mixed period in a third embodiment.

FIG. 14 is a diagram showing an example of a driving current waveform in the third period P3. In FIG. 14, the ordinate indicates the driving current I and the abscissa indicates the time T. The driving current I in the first polarity state is shown as positive and the driving current I in the second polarity state is shown as negative.

As shown in FIG. 14, in this embodiment, a mixed period PH2 is provided. In the mixed period PH2, the first period P1 and the second period P2 are alternately repeated or the first period P1 and the third period P3 are alternately repeated. That is, in the mixed period PH2, according to the predetermined condition, the first period P1 and the second period P2 are alternately repeated or the first period P1 and the third period P3 are alternately repeated.

In the example shown in FIG. 14, the first period P1 and the third period P3 are alternately repeated in the mixed period PH2. When the first period P1 and the second period P2 are alternately repeated in the mixed period PH2, a driving current waveform in the mixed period PH2 is the same as the driving current waveform in the mixed period PH1 in the first or second embodiment.

The third period P3 is a period alternately including a first DC period P31 and a second DC period P32. The first DC period P31 is a period in which a direct current is supplied to the discharge lamp 90. In the example shown in FIG. 14, in the first DC period P31, the driving current I having the first polarity and the fixed current value Im1 is supplied to the discharge lamp 90.

The second DC period P32 is a period in which a direct current having a polarity opposite to the polarity of the direct current supplied to the discharge lamp 90 in the first DC period P31 is supplied to the discharge lamp 90. That is, in the example shown in FIG. 14, in the second DC period P32, the driving current I having the second polarity and the fixed current value −Im1 is supplied to the discharge lamp 90.

The polarity of the direct current supplied to the discharge lamp 90 in the first DC period P31 and the polarity of the direct current supplied to the discharge lamp 90 in the second DC period P32 are inverted every time the third period P3 is provided. That is, in the third period P3 provided next to the third period P3 shown in FIG. 14, the polarity of the direct current supplied to the discharge lamp 90 in the first DC period P31 is the second polarity. The polarity of the direct current supplied to the discharge lamp 90 in the second DC period P32 is the first polarity.

Length t31 of the first DC period P31 is larger than length t32 of the second DC period P32. The length t31 of the first DC period P31 is, for example, ten times or more as large as the length t32 of the second DC period P32. Since the length t31 of the first DC period P31 is set in this way, in the third period P3, it is possible to suitably suppress, while suitably heating one electrode, the temperature of the other electrode from excessively dropping.

The length t31 of the first DC period P31 is, for example, equal to or larger than 5.0 ms (milliseconds) and equal to or smaller than 20 ms (milliseconds). The length t32 of the second DC period P32 is smaller than 0.5 ms (milliseconds). A total of the lengths t31 of the first DC periods P31 in the third period P3 is larger than the length t2 of the second period P2 provided when the predetermined condition is not satisfied.

The total of the lengths t31 of the first DC periods P31 in the third period P3 is length obtained by adding up the lengths t31 of all the first DC periods P31 included in the third period P3. In the example shown in FIG. 14, three first DC periods P31 are included in the third period P3. Therefore, the total of the lengths t31 of the first DC periods P31 in the third period P3 is length obtained by adding up the lengths t31 of the three first DC periods P31.

The total of the lengths t31 of the first DC periods P31 in the third period P3 is, for example, equal to or larger than 5.0 ms (milliseconds) and equal to or smaller than 100 ms (milliseconds). Since the total of the lengths t31 of the first DC periods P31 in the third period P3 is set in this way, it is possible to suitably increase the heat load applied to the protrusion 552p of the first electrode 92.

Note that, in the following explanation, the total of the lengths t31 of the first DC periods P31 in the third period P3 is sometimes simply referred to as total length of the first DC periods P31.

The lengths t31 of the first DC periods P31 may be the same or may be different from one another. In the example shown in FIG. 14, the lengths t31 of the first DC periods P31 are the same.

In this embodiment, the control section 40 controls the discharge lamp driving section 230 such that periods alternately repeated in the mixed period PH2 are switched according to the predetermined condition. That is, the control section 40 controls the discharge lamp driving section 230 according to the predetermined condition such that the third period P3 is provided instead of the second period P2. This is explained in detail below.

Figure 15:
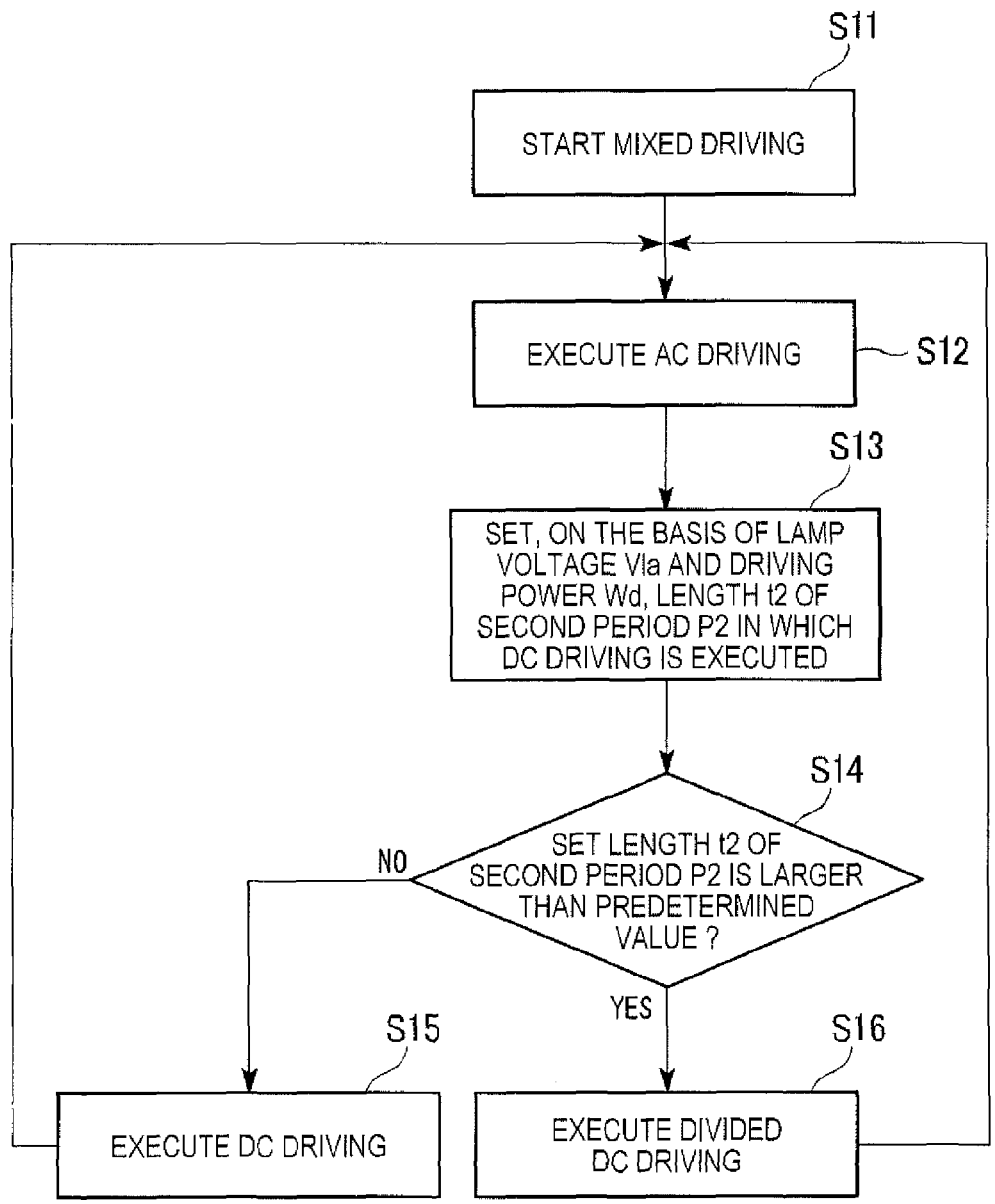
FIG. 15 is a flowchart for explaining an example of a control procedure of a discharge lamp driving section by a control section in the third embodiment.

FIG. 15 is a flowchart for explaining an example of control by the control section 40 in the mixed period PH2. As shown in FIG. 15, after starting the mixed driving (step S11), the control section 40 executes the AC driving (step S12). Consequently, the first period P1 in the mixed period PH2 is started.

Subsequently, as explained in the first embodiment, the control section 40 sets, on the basis of the lamp voltage Vla and the driving power Wd, the length t2 of the second period P2 in which the DC driving is executed (step S13). The control section 40 determines whether the set length t2 of the second period P2 is larger than a predetermined value (step S14). That is, in this embodiment, the predetermined condition is whether the set length t2 of the second period P2 is larger than the predetermined value.

If the length t2 of the second period P2 is equal to or smaller than the predetermined value (NO in step S14), the control section 40 executes the DC driving (step S15). Consequently, the second period P2 is started. That is, in this case, a driving current waveform in the mixed period PH2 is a waveform in which the first period P1 and the second period P2 are alternately repeated.

On the other hand, if the length t2 of the second period P2 is larger than the predetermined value (YES in step S14), the control section 40 executes the divided DC driving (step S16). Consequently, the third period P3 is started. That is, in this case, a driving current waveform in the mixed period PH2 is a waveform in which the first period P1 and the third period P3 are alternately repeated. The predetermined value in step S14 is, for example, 20 ms (milliseconds).

In this way, in this embodiment, when the set length t2 of the second period P2 is larger than the predetermined value, the control section 40 controls the discharge lamp driving section 230 such that the third period P3 is provided instead of the second period P2. That is, in this embodiment, if the length t2 of the second period P2 is set larger than the predetermined value, the second period P2 is not provided. Therefore, the length t2 of the second period P2 to be provided is equal to or smaller than the predetermined value. A total of the lengths t31 of the first DC periods P31 in the third period P3 shown in FIG. 14 is the same as the set length t2 of the second period P2. That is, when the set length t2 of the second period P2 is larger than the predetermined value, the second period P2 is not provided. Instead, a period in which a direct current is supplied to the discharge lamp 90 is divided into a plurality of first DC periods P31 and provided by an amount of the set length t2. The third period P3 includes the second DC period P32 in addition to the first DC period P31. Therefore, a total length of the first DC periods P31 is larger than the length t2 of the second period P2 provided when the set length t2 of the second period P2 is equal to or smaller than the predetermined value.

Specifically, for example, when the predetermined value is 20 ms (milliseconds), if the length t2 of the second period P2 is set larger than 20 ms (milliseconds) and equal to or smaller than 40 ms (milliseconds), the control section 40 divides the second period P2 into two first DC periods P31 and controls the discharge lamp driving section 230 such that the second DC period P32 is provided between the first DC periods P31. For example, if the length t2 of the second period P2 is set larger than 40 ms (milliseconds) and equal to or smaller than 60 ms (milliseconds), as in the example shown in FIG. 14, the control section 40 divides the second period P2 into three first DC periods P31 and controls the discharge lamp driving section 230 such that the second DC periods P32 are provided among the first DC periods P31.

In the example shown in FIG. 15, in the mixed period PH2, every time the AC driving (the first period P1) is executed, which of the DC driving (the second period P2) and the divided DC driving (the third period P3) is executed next is selected. Therefore, in some cases, both of the second period P2 and the third period P3 are provided in one mixed period PH2. For example, it is assumed that the first period P1 and the second period P2 are alternately repeated in an initial stage of a start of the mixed period PH2. In this case, when a set value of the length t2 of the second period P2 increases to be larger than the predetermined value because, for example, the lamp voltage Vla increases at a predetermined point in the mixed period PH2, a driving current waveform in the mixed period PH2 is a driving current waveform in which the first period P1 and the third period P3 are alternately repeated since the predetermined point in the mixed period PH2.

As explained above, in this embodiment, the control section 40 determines on the basis of the length t2 of the second period P2 to be set which of the second period P2 and the third period P3 is provided. In this embodiment, the length t2 of the second period P2 is set on the basis of both of the lamp voltage Vla and the driving power Wd. That is, in this embodiment, the control section 40 determines on the basis of both of the lamp voltage Vla and the driving power Wd which of the second period P2 and the third period P3 is provided.

For example, when the second period P2 in which the length t2 is set larger than the predetermined value is provided in the mixed period PH2, it is likely that the temperature of an electrode, for example, the second electrode 93 opposite to an electrode heated in the second period P2 excessively drops.

On the other hand, according to this embodiment, when the set length t2 of the second period P2 is larger than the predetermined value, instead of the second period P2, the third period P3 is provided that includes the second DC period P32 in which a direct current having a polarity opposite to the polarity of a direct current supplied to the discharge lamp 90 in the first DC period P31 is supplied to the discharge lamp 90. A total length of the first DC periods P31 in the third period P3 is the same as the set length t2 of the second period P2. Therefore, it is possible to suppress, while sufficiently heating the electrode, for example, the first electrode 92 heated in the second period P2, the temperature of the second electrode 93 opposite to the first electrode 92 from excessively dropping.

According to this embodiment, a total of the lengths t31 of the first DC periods P31 in the third period P3 is equal to or larger than 5.0 ms (milliseconds) and equal to or smaller than 100 ms (milliseconds). Therefore, it is possible to more suitably heat an electrode operating as an anode in the first DC period P31.

According to this embodiment, the total of the lengths t31 of the first DC periods P31 in the third period P3 is larger than the length t2 of the second period P2 provided when the set length t2 of the second period P2 is equal to or smaller than the predetermined value. Therefore, compared with when the second period P2 is provided, it is possible to further heat the electrode operating as the anode in the first DC period P31.

Note that, in this embodiment, configurations explained below can also be adopted.

In this embodiment, when a plurality of mixed periods PH2 are provided, the control section 40 may determine, once every time the mixed period PH2 is provided, which of the second period P2 and the third period P3 is provided in the mixed period PH2. In this case, in one mixed period PH2, only the first period P1 and the second period P2 are alternately repeated or only the first period P1 and the third period P3 are alternately repeated. That is, in this case, in one mixed period PH2, only one of the second period P2 and the third period P3 are provided together with the first period P1.

In this embodiment, when the plurality of mixed periods PH2 are provided, the control section 40 may determine, once every time a predetermined number of mixed periods PH2 are provided, which of the second period P2 and the third period P3 is provided in the mixed period PH2.

In the above explanation, the control section 40 determines on the basis of the length t2 of the second period P2 set according to the lamp voltage Vla and the driving power Wd which of the second period P2 and the third period P3 is provided. However, the invention is not limited to this. In this embodiment, rather than determining whether the length t2 of the second period P2 set according to the lamp voltage Vla and the driving power Wd is larger than the predetermined value, the control section 40 may determine more directly on the basis of at least one of the lamp voltage Vla and the driving power Wd which of the second period P2 and the third period P3 is provided.

In this case, the length t2 of the second period P2 does not have to change according to the lamp voltage Vla or the driving power Wd. That is, the control section 40 may control the discharge lamp driving section 230 on the basis of at least one of the lamp voltage Vla and the driving power Wd such that the third period P3 is provided instead of the second period P2. More specifically, when the lamp voltage Vla is larger than a predetermined value (a first predetermined value) or the driving power Wd is smaller than a predetermined value (a second predetermined value), the control section 40 may control the discharge lamp driving section 230 such that the third period P3 is provided instead of the second period P2. That is, in this embodiment, the predetermined condition is whether the lamp voltage Vla is larger than the predetermined value or whether the driving power Wd is smaller than the predetermined value. In this case, the control section 40 sets a total of the lengths t31 of the first DC periods P31 in the third period P3, for example, on the basis of at least one of the detected lamp voltage Vla and the detected driving power Wd.

In this embodiment, the control section 40 does not have to invert, every time the third period P3 is provided, the polarity of the direct current supplied to the discharge lamp 90 in the first DC period P31 and the polarity of the direct current supplied to the discharge lamp 90 in the second DC period P32. That is, in this embodiment, the third period P3 may be continuously provided twice or more in which the polarity of the direct current supplied to the discharge lamp 90 in the first DC period P31 and the polarity of the direct current supplied to the discharge lamp 90 in the second DC period P32 are the same.

Fourth Embodiment

A fourth embodiment is different from the first embodiment in that a fourth period P4 and a fifth period P5 are provided. Note that explanation of components same as the components in the embodiments is sometimes omitted by, for example, denoting the components with the same reference numerals and signs as appropriate.

In this embodiment, the control section 40 is capable of executing low-frequency AC driving and biased driving in addition to the driving described in the first embodiment. The low-frequency AC driving is driving in which an alternating current having a frequency lower than the frequency of an alternating current of the AC driving is supplied to the discharge lamp 90. The biased driving is driving in which direct currents having different polarities are alternately supplied to the discharge lamp 90 and the length of the direct current having one polarity is sufficiently longer than the length of the direct current having the other polarity.

In this embodiment, the control section 40 controls the discharge lamp driving section 230 such that the fourth period P4, which is a period in which the low-frequency AC driving is executed, and the fifth period P5, which is a period in which the biased driving is executed, are provided in addition to the mixed period PH1 in which the first period P1 and the second period P2 are alternately repeated.

Figure 16:
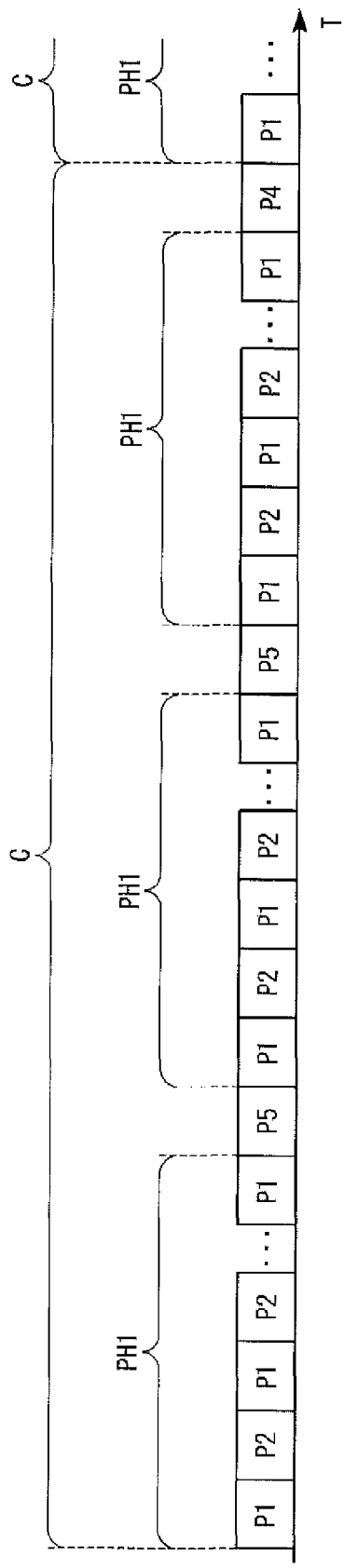
FIG. 16 is a schematic diagram showing a change in a period in which a driving current is supplied to a discharge lamp in a fourth embodiment.

FIG. 16 is a schematic diagram showing a change in a period in which the driving current I is supplied to the discharge lamp 90 in this embodiment. As shown in FIG. 16, in this embodiment, the control section 40 controls the discharge lamp driving section 230 such that a driving cycle C is repeated. In this embodiment, the driving cycle C includes the first period P1, the second period P2, the fourth period P4, and the fifth period P5. That is, the driving cycle C is executed by the control section 40 performing the four kinds of driving. In the driving cycle C, the mixed period PH1 in which the first period P1 and the second period P2 are alternately repeated is provided. In this embodiment, a plurality of mixed periods PH1 are provided.

In this embodiment, the fourth period P4 is provided between the mixed periods PH1 temporally adjacent to each other. The fourth period P4 is provided, for example, immediately after the first period P1. The fourth period P4 is provided, for example, immediately before the first period P1.

Figure 17:
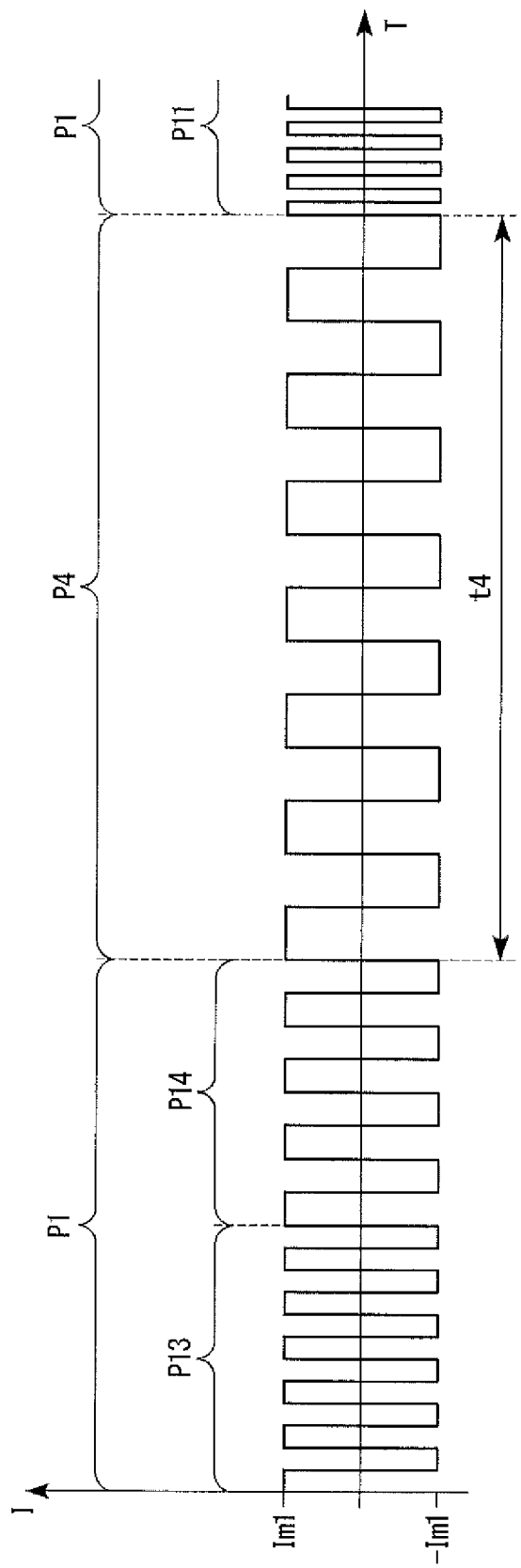
FIG. 17 is a diagram showing an example of a driving current waveform in a fourth period in the fourth embodiment.

FIG. 17 is a diagram showing an example of a driving current waveform in the fourth period P4. In FIG. 17, the ordinate indicates the driving current I and the abscissa indicates the time T. The driving current I in the first polarity state is shown as positive and the driving current I in the second polarity state is shown as negative.

As shown in FIG. 17, the fourth period P4 is a period in which an alternating current having a second frequency f2 lower than the first frequency f1 is supplied to the discharge lamp 90. That is, the second frequency f2 of the alternating current in the fourth period P4 is lower than all of the first frequencies f11 to f14. A value of the second frequency f2 is, for example, equal to or larger than 10 Hz and equal to or smaller than 100 Hz.

A start polarity in the fourth period P4 is inverted every time the fourth period P4 is provided. In the example shown in FIG. 17, the start polarity in the fourth period P4 is the first polarity. Therefore, in the fourth period P4 provided next to the fourth period P4 shown in FIG. 17, the start polarity is the second polarity.

Length t4 of the fourth period P4 is, for example, larger than the length t2 of the second period P2. The length t4 of the fourth period P4 is equal to or larger than length of six cycles and equal to or smaller than length of thirty cycles of an alternating current having the second frequency f2. Since the length t4 of the fourth period P4 is set in this way, it is possible to suitably adjust the shape of the protrusion 552p of the first electrode 92.

As shown in FIG. 16, the fifth period P5 is provided between the mixed periods PH1 temporally adjacent to each other. The fifth period P5 is provided, for example, immediately after the first period P1. The fifth period P5 is provided, for example, immediately before the first period P1.

Figure 18:
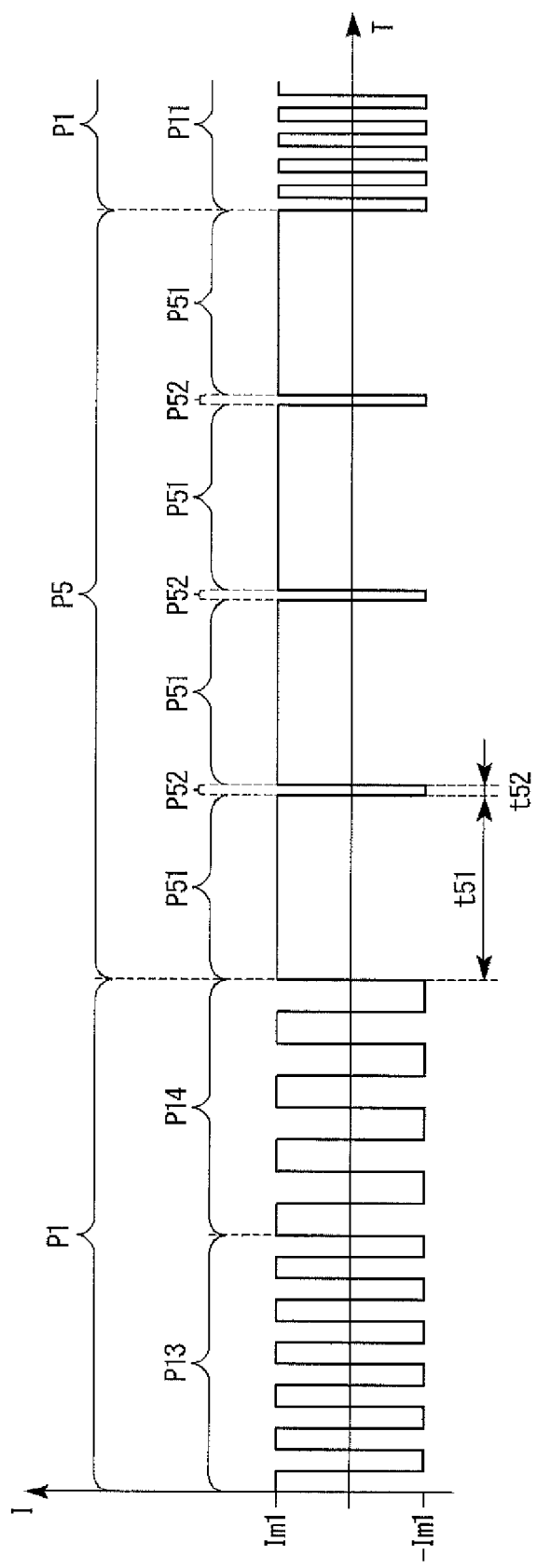
FIG. 18 is a diagram showing an example of a driving current waveform in a fifth period in the fourth embodiment.

FIG. 18 is a diagram showing an example of a driving current waveform in the fifth period P5. In FIG. 18, the ordinate indicates the driving current I and the abscissa indicates the time T. The driving current I in the first polarity state is shown as positive and the driving current I in the second polarity state is shown as negative.

As shown in FIG. 18, the fifth period P5 is a period alternately including a third DC period P51 and a fourth DC period P52. The third DC period P51 is a period in which a direct current is supplied to the discharge lamp 90. In the example shown in FIG. 18, in the third DC period P51, the direct current I having the first polarity and the fixed current value Im1 is supplied to the discharge lamp 90.

The fourth DC period P52 is a period in which a direct current having a polarity opposite to the polarity of a direct current supplied to the discharge lamp 90 in the third DC period P51 is supplied to the discharge lamp 90. That is, in the example shown in FIG. 18, in the fourth DC period P52, the driving current I having the second polarity and the fixed current value −Im1 is supplied to the discharge lamp 90.

The polarity of the direct current supplied to the discharge lamp 90 in the third DC period P51 and the polarity of the direct current supplied to the discharge lamp 90 in the fourth DC period P52 are inverted every time the fifth period P5 is provided. That is, in the next fifth period P5 provided after the fifth period P5 shown in FIG. 18, the polarity of the direct current supplied to the discharge lamp 90 in the third DC period P51 is the second polarity and the polarity of the direct current supplied to the discharge lamp 90 in the fourth DC period P52 is the first polarity.

Length t51 of the third DC period P51 is larger than length t52 of the fourth DC period P52. The length t51 of the third DC period P51 is, for example, ten times or more as large as the length t52 of the fourth DC period P52. Since the length t51 of the third DC period P51 is set in this way, in the fifth period P5, it is possible to suitably suppress, while suitably heating one electrode, the temperature of the other electrode from excessively dropping.

The length t51 of the third DC period P51 is, for example, equal to or larger than 5.0 ms (milliseconds) and equal to or smaller than 20 ms (milliseconds). The length t52 of the fourth DC period P52 is smaller than 0.5 ms (milliseconds).

A total of the lengths t51 of the third DC periods P51 in the fifth period P5 is larger than the length t2 of the second period P2 and larger than the length of a half cycle of an alternating current in the fourth period P4, that is, an alternating current having the second frequency f2. The total of the lengths t51 of the third DC periods P51 in the fifth period P5 is length obtained by adding up the lengths t51 of all the third DC periods P51 included in the fifth period P5. In the example shown in FIG. 18, four third DC periods P51 are included in the fifth period P5. Therefore, the total of the lengths t51 of the third DC periods P51 in the fifth period P5 is length obtained by adding up the lengths t51 of the four third DC periods P51.

The total of the lengths t51 of the third DC periods P51 in the fifth period P5 is, for example, equal to or larger than 10 ms (milliseconds) and equal to or smaller than 1.0 s (second). Since the total of the lengths t51 of the third DC periods P51 in the fifth period P5 is set in this way, it is possible to suitably increase the heat load applied to the protrusion 552p of the first electrode 92.

Note that, in the following explanation, the total of the lengths t51 of the third DC periods P51 in the fifth period P5 is sometimes simply referred to as total length of the third DC periods P51.

The lengths t51 of the third DC periods P51 may be the same or may be different from one another. In the example shown in FIG. 18, the lengths t51 of the third DC periods P51 are the same.

In this embodiment, the control section 40 sets the total length of the third DC periods P51 on the basis of both of the lamp voltage Vla and the driving power Wd. That is, in this embodiment, the control section 40 sets the total length of the third DC periods P51 on the basis of at least one of the lamp voltage Vla and the driving power Wd. In other words, in this embodiment, the control section 40 changes the total length of the third DC periods P51 on the basis of at least one of the lamp voltage Vla and the driving power Wd. For example, the total length of the third DC periods P51 is set larger as the lamp voltage Vla is higher. For example, the total length of the third DC periods P51 is set smaller as the driving power Wd is larger.

When the driving power Wd is fixed, a relation between the total length of the third DC period P51 and the lamp voltage Vla is represented by, for example, a linear function. When the lamp voltage Vla is fixed, a relation between the total length of the third DC periods P51 and the driving power Wd is represented by, for example, a linear function. Note that, in this specification, "the total of the lengths t51 of the third DC periods P51 in the fifth period P5 is set larger as the lamp voltage Vla is higher (or increases)" may be only within a predetermined range of a value of the lamp voltage Vla or may be within all ranges that the value of the lamp voltage Vla can take.

In this specification, "the total of the lengths t51 of the third DC periods P51 in the fifth period P5 is set smaller as the driving power Wd is larger (or increases)" may be only within a predetermined range of a value of the driving power Wd or may be within all ranges that the value of the driving power Wd can take.

That is, when the lamp voltage Vla is equal to or smaller than the predetermined value, for example, the total length of the third DC periods P51 may be fixed. When the driving power Wd is equal to or smaller than the predetermined value, for example, the total length of the third DC periods P51 may be fixed.

In this specification, "the total of the lengths t51 of the third DC periods P51 in the fifth period P5 is set larger as the lamp voltage Vla is higher (or increases)" includes such setting at the time when the driving power Wd is fixed. In this specification, "the total of the lengths t51 of the third DC periods P51 in the fifth period P5 is set smaller as the driving power Wd is larger (or increases)" includes such setting at the time when the lamp voltage Vla is fixed.

That is, for example, when the total length of the third DC periods P51 is set on the basis of both of the lamp voltage Vla and the driving power Wd as in this embodiment, actual total length of the third DC periods P51 sometimes decreases because the driving power Wd increases even when the lamp voltage Vla increases. The actual total length of the third DC period P51 sometimes increases because the lamp voltage Vla increases even when the driving power Wd increases.

The number of third DC periods P51 included in the fifth period P5 is determined, for example, on the basis of the total length of the third DC periods P51. The number of third DC periods P51 is determined such that the set total length of the third DC periods P51 can be realized, for example, within a range in which the length t51 of the third DC period P51 is equal to or smaller than a predetermined value. That is, the number of third DC periods P51 included in the fifth period P5 is larger as the total length of the third DC periods P51 is larger.

Specifically, for example, when the predetermined value is set as 20 ms (milliseconds), if the total length of the third DC periods P51 is larger than 20 ms (milliseconds) and equal to or smaller than 40 ms (milliseconds), the number of third DC periods P51 included in the fifth period P5 is two. If the total length of the third DC periods P51 is larger than 40 ms (milliseconds) and equal to or smaller than 60 ms (milliseconds), the number of third DC periods P51 included in the fifth period P5 is three.

In the example shown in FIG. 18, the number of third DC periods P51 included in the fifth period P5 is four. That is, for example, when the predetermined value is set as 20 ms (milliseconds), the total length of the third DC periods P51 is larger than 60 ms (milliseconds) and equal to or smaller than 80 ms (milliseconds).

By performing the setting as explained above, it is possible to realize the set total length of the third DC periods P51 while setting the lengths t51 of the third DC periods P51 to be equal to or smaller than the predetermined value (20 ms).

As explained above, in this embodiment, the fourth period P4 and the fifth period P5 are provided between mixed periods PH1 temporally adjacent to each other. In this embodiment, the fourth period P4 and the fifth period P5 are cyclically provided along a fixed pattern. This is explained in detail below.

Figure 19:
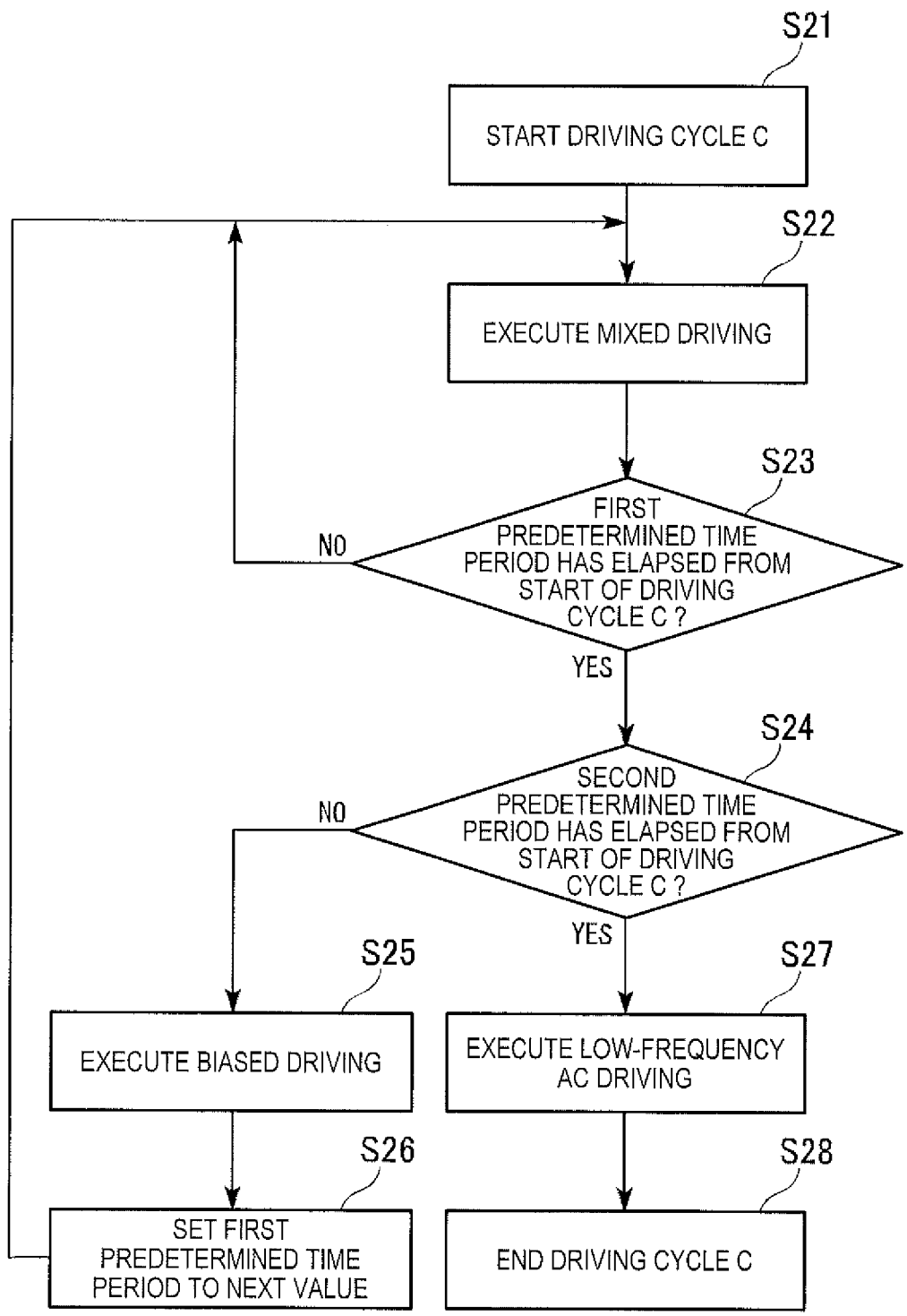
FIG. 19 is a flowchart for explaining an example of a control procedure of a discharge lamp driving section by a control section in the fourth embodiment.

FIG. 19 is a flowchart for explaining an example of control in the driving cycle C by the control section 40 in this embodiment. As shown in FIG. 19, after starting the driving cycle C (step S21), first, the control section 40 executes the mixed driving (step S22). Consequently, the mixed period PH1 is started. The control section 40 determines whether a first predetermined time period has elapsed from the start of the driving cycle C (step S23).

The first predetermined time period is time period from a point in time when the driving cycle C is started to a first predetermined time. In this embodiment, a plurality of the first predetermined times are set at an equal interval. Therefore, in this embodiment, a plurality of the first predetermined time periods are set.

Specifically, for example, in this embodiment, the predetermined time is set at every 30 s (seconds). That is, the first predetermined times are, for example, times of 30 s (seconds), 60 s (seconds), and 90 s (seconds) starting from the point in time when the driving cycle C is started. That is, the first predetermined time periods are, for example, 30 s (seconds), 60 s (seconds), and 90 s (seconds). Immediately after the driving cycle C is started, the first predetermined time period is set to an initial value (30 s).

When the first predetermined time period has not elapsed from the start of the driving cycle C (NO in step S23), the control section 40 continues the mixed driving. On the other hand, when the first predetermined time period has elapsed from the start of the driving cycle C (YES in step S23), the control section 40 determines whether a second predetermined time period has elapsed from the start of the driving cycle C (step S24).

The second predetermined time period is time period from the point in time when the driving cycle C is started to second predetermined time. The second predetermined time is, for example, time of 90 s (seconds) starting from the point in time when the driving cycle C is started. That is, the second predetermined time period is, for example, 90 s (seconds). The second predetermined time period is larger than the initial value (e.g., 30 s) of the first predetermined time period.

If the second predetermined time period has not elapsed from the start of the driving cycle C (NO in step S24), the control section 40 executes the biased driving (step S25). Consequently, the fifth period P5 is started. After the fifth period P5 ends, the control section 40 sets the first predetermined time period to the next value (60 s) (step S26) and executes the mixed driving again (step S22).

On the other hand, if the second predetermined time period has elapsed from the start of the driving cycle C (YES in step S24), the control section 40 executes the low-frequency AC driving (step S27). Consequently, the fourth period P4 is started. After the fourth period P4 ends, the control section 40 ends the driving cycle C (step S28). Thereafter, the control section 40 starts the next driving cycle C (step S21).

As explained above, for example, when the initial first predetermined time period (30 s) has elapsed from the start of the driving cycle C and when the second first predetermined time period (60 s) has elapsed from the start of the driving cycle C, the biased driving is executed and the fifth period P5 is provided.

On the other hand, when the third first predetermined time period (90 s) has elapsed from the start of the driving cycle C, since the second predetermined time period (90 s) has also elapsed, the low-frequency AC driving is executed and the fourth period P4 is set.

In this way, the fourth period P4 and the fifth period P5 are cyclically provided along a fixed pattern. That is, in this embodiment, the control section 40 controls the discharge lamp driving section 230 such that one of the fourth period P4 and the fifth period P5 is provided at every first predetermined interval, that is, in the example explained above, 30 s (seconds) and such that the fourth period P4 is provided at every second predetermined interval, that is, in the example explained above, 90 s (seconds). The second predetermined interval is larger than the first predetermined interval.

In the example explained above, after two fifth periods P5 are provided at every 30 s (seconds), the fourth period P4 is provided. That is, the two fifth periods P5 are provided after the fourth period P4 is provided and before the next fourth period P4 is provided. The polarity of the direct current supplied to the discharge lamp 90 in the third DC period P51 in the fifth period P5 and the polarity of the direct current supplied to the discharge lamp 90 in the fourth DC period P52 in the fifth period P5 are inverted every time the fifth period P5 is provided. Therefore, in the two fifth periods P5 provided between the fourth periods P4 temporally adjacent to each other, polarities of the driving current I supplied to the discharge lamp 90 are opposite to each other.

That is, in this embodiment, the control section 40 controls the discharge lamp driving section 230 such that, at the second predetermined interval at which the fourth period P4 is provided, two fifth periods P5 are provided. The two fifth periods P5 are the fifth period P5 alternately including the third DC period P51 in which a direct current having the first polarity is supplied to the discharge lamp 90 and the fourth DC period P52 in which a direct current having the second polarity is supplied to the discharge lamp 90 and the fifth period P5 alternately including the third DC period P51 in which the direct current having the second polarity is supplied to the discharge lamp 90 and the fourth DC period P52 in which the direct current having the first polarity is supplied to the discharge lamp 90. In other words, the two fifth periods P5 are provided in the periods between the fourth periods P4 temporally adjacent to each other.

According to this embodiment, the fourth period P4 and the fifth period P5 are provided in addition to the mixed period PH1 in which the first period P1 and the second period P2 are alternately repeated. An alternating current is supplied to the discharge lamp 90 in the first period P1 and a direct current is supplied to the discharge lamp 90 in the second period P2. In the fourth period P4, an alternating current having the second frequency f2 lower than the first frequency f1 of the alternating current in the first period P1 is supplied to the discharge lamp 90. Therefore, a heat load applied to the first electrode 92 in the fourth period P4 is larger than the heat load applied to the first electrode 92 in the first period P1.

In the fifth period P5, the third DC period P51 and the fourth DC period P52 are provided. The length t51 of the third DC period P51 is larger than the length t52 of the fourth DC period P52. The length t52 of the fourth DC period P52 is smaller than 0.5 ms (milliseconds). Therefore, in the fifth period P5, it is possible to heat an electrode operating as an anode in the third DC period P51. Note that, in the following explanation, it is assumed that the electrode to be heated is, for example, the first electrode 92.

The total length of the third DC periods P51 is larger than the length t2 of the second period P2 and larger than the length of a half cycle of the alternating current in the fourth period P4. Therefore, a heat load applied to the first electrode 92 to be heated in the fifth period P5 is larger than the heat load applied to the first electrode 92 heated in the second period P2.

In this way, in the fourth period P4 and the fifth period P5, compared with the first period P1 or the second period P2, the heat load applied to the first electrode 92 is large. Therefore, by cyclically providing the fourth period P4 and the fifth period P5, it is possible to more greatly vary the heat load applied to the first electrode 92 compared with when only the mixed period PH1 is provided. Consequently, according to this embodiment, it is easier to maintain the shape of the protrusion 552*p* and further improve the life of the discharge lamp 90.

In the fifth period P5, the fourth DC period P52 is provided in which a direct current having a polarity opposite to the polarity of the direct current supplied to the discharge lamp 90 in the third DC period P51 is supplied to the discharge lamp 90. Therefore, it is possible to suppress the temperature of the second electrode 93 on the opposite side of the first electrode 92 heated in the fifth period P5 from excessively dropping. For example, if the temperature of the second electrode 93 excessively drops, when the second electrode 93 is heated and melted, it is likely that the temperature of the second electrode 93 is less easily raised and the protrusion 562*p* of the second electrode 93 is less easily melted. Since the length t52 of the fourth DC period P52 is smaller than 0.5 ms (milliseconds), the temperature of the first electrode 92 less easily drops in the fourth DC period P52. Therefore, it is easy to suitably heat the first electrode 92 in the third DC period P51. In the fourth period P4 and the fifth period P5, the heat load applied to the first electrode 92 more easily increases in the fifth period P5. Therefore, for example, when a period in which the fifth period P5 is cyclically provided lasts long, it is likely that the protrusion 552*p* of the first electrode 92 is excessively melted.

On the other hand, according to this embodiment, in addition to the fifth period P5, the fourth period P4 is cyclically provided in which the heat load applied to the first electrode 92 more easily decreases than in the fifth period P5. Therefore, it is possible to suppress the protrusion 552*p* from being excessively melted in the fifth period P5 and adjust the shape of the protrusion 552*p*.

According to this embodiment, the fifth period P5 is provided between the mixed periods PH1 temporally adjacent to each other. Therefore, it is easy to appropriately provide the fifth period P5 in which the heat load applied to the first electrode 92 is relatively large.

Therefore, according to this embodiment, it is easier to maintain the shape of the protrusion 552*p* and further improve the life of the discharge lamp 90.

In the first period P and the second period P2, the heat load applied to the first electrode 92 more easily decreases in the first period P1. According to this embodiment, the fifth period P5 is provided immediately after the first period P1. Therefore, it is easier to increase fluctuation in the heat load due to a shift from the mixed period PH1 to the fifth period P5. Therefore, it is easier to grow the protrusion 552p of the first electrode 92. According to this embodiment, the fourth period P4 is provided between the mixed periods PH1 temporally adjacent to each other. Therefore, it is easy to appropriately provide the fourth period P4 in which the heat load applied to the first electrode 92 is relatively large. Therefore, according to this embodiment, it is easier to maintain the shape of the protrusion 552p. It is possible to further improve the life of the discharge lamp 90. According to this embodiment, the fourth period P4 is provided immediately after the first period P1. In the first period P1 and the fourth period P4, an alternating current is supplied to the discharge lamp 90. Therefore, when a period in which the alternating current is supplied to the discharge lamp 90 lasts and the first period P1 shifts to the fourth period P4, a frequency changes from the first frequency f1 to the second frequency f2 lower than the first frequency f1. Consequently, compared with when the fourth period P4 is provided immediately after the second period P2 in which the direct current is supplied to the discharge lamp 90, it is easy to moderate fluctuation in the heat load applied to the first electrode 92. It is easy to adjust the shape of the protrusion 552p of the first electrode 92 in the fourth period P4.

According to this embodiment, one of the fourth period P4 and the fifth period P5 is provided at every first predetermined interval. Therefore, it is possible to cyclically increase the heat load applied to the protrusion 552p of the first electrode 92. It is easy to suitably maintain the shape of the protrusion 552p.

According to this embodiment, the fourth period P4 is provided at every second predetermined interval larger than the first predetermined interval. Therefore, it is easy to set a frequency of the provision of the fourth period P4 lower than a frequency of the provision of the fifth period P5. Consequently, the fourth period P4 can be provided after the fifth period P5 is provided several times. Therefore, it is possible to adjust the shape of the protrusion 552p while suitably melting the protrusion 552p of the first electrode 92. According to this embodiment, the polarity of the direct current supplied to the discharge lamp 90 in the third DC period P51 and the polarity of the direct current supplied to the discharge lamp 90 in the fourth DC period P52 are inverted every time the fifth period P5 is provided. Therefore, it is easy to alternately heat the first electrode 92 and the second electrode 93 in a well-balanced state. Therefore, according to this embodiment, it is possible to grow the protrusion 552p of the first electrode 92 and the protrusion 562p of the second electrode 93 in a well-balanced state. It is easy to maintain both of the shape of the protrusion 552p and the shape of the protrusion 562p.

According to this embodiment, the start polarity in the fourth period P4 is inverted every time the fourth period P4 is provided. Therefore, even when the polarity of the direct current supplied to the discharge lamp 90 in the second period P2 and the fifth period P5 is inverted, when a period immediately before the fourth period P4 shifts to the fourth period P4 and when the fourth period P4 shifts to a period immediately after the fourth period P4, the polarity can be inverted. That is, the polarity of the driving current I supplied to the discharge lamp 90 can be inverted before and after the period shifts. Therefore, according to this embodiment, it is possible to grow the protrusion 552p of the first electrode 92 and the protrusion 562p of the second electrode 93 in a well-balanced state. It is easier to maintain the shape of the protrusion 552p and the shape of the protrusion 562p.

For example, when the discharge lamp 90 is deteriorated, the protrusion 552p of the first electrode 92 is less easily melted and the shape of the protrusion 552p is less easily maintained. Therefore, it is likely that the shape of the protrusion 552p is less easily sufficiently maintained even in the fifth period P5 in which the heat load applied to the first electrode 92 is relatively large.

For example, when the driving power Wd supplied to the discharge lamp 90 is relatively large, the heat load applied to the first electrode 92 easily increases. Therefore, when the fifth period P5 is provided, it is likely that the heat load applied to the first electrode 92 excessively increases.

As measures against these problems, according to this embodiment, the control section 40 sets the total length of the third DC periods P51 on the basis of at least one of the lamp voltage Vla and the driving power Wd. Therefore, it is possible to solve at least one of the problems.

Specifically, when the total length of the third DC periods P51 is set on the basis of the lamp voltage Vla, by setting the total length of the third DC periods P51 larger as the lamp voltage Vla is higher (increases), when the discharge lamp 90 is deteriorated, it is possible to set the heat load applied to the first electrode 92 in the fifth period P5 larger. Consequently, when the discharge lamp 90 is deteriorated, it is easy to suitably melt the protrusion 552p of the first electrode 92 in the fifth period P5. It is easy to maintain the shape of the protrusion 552p.

On the other hand, when the total length of the third DC periods P51 is set on the basis of the driving power Wd, by setting the total length of the third DC periods P51 smaller as the driving power Wd is larger (increases), when the driving power Wd is relatively large, it is possible to set the heat load applied to the first electrode 92 in the fifth period P5 smaller. Consequently, it is possible to suppress the protrusion 552p of the first electrode 92 from being excessively melted. It is easy to maintain the shape of the protrusion 552p.

According to this embodiment, the total length of the third DC periods P51 is set on the basis of both of the lamp voltage Vla and the driving power Wd. Therefore, it is possible to solve both of the problems.

For example, in the fifth period P5, when a difference (a ratio) between the length t51 of the third DC period P51 and the length t52 of the fourth DC period P52 is small, a difference between a rise width of the temperature of the first electrode 92 in the third DC period P51 and a drop width of the temperature of the first electrode 92 in the fourth DC period P52 is small. Therefore, it is less easy to raise the temperature of the first electrode 92 in the fifth period P5. Consequently, it is likely that the heat load applied to the first electrode 92 in the fifth period P5 cannot be sufficiently increased and the protrusion 552p cannot be sufficiently melted.

On the other hand, according to this embodiment, the length t51 of the third DC period P51 is ten times or more as large as the length t52 of the fourth DC period P52. Therefore, it is possible to set the rise width of the temperature of the first electrode 92 in the third DC period P51 sufficiently large with respect to the drop width of the temperature of the first electrode 92 in the fourth DC period P52. Consequently, according to this embodiment, it is possible to suitably apply the heat load to the first electrode 92 in the fifth period P5. It is easier to maintain the shape of the protrusion 552p.

According to this embodiment, the total of the lengths t51 of the third DC periods P51 in the fifth period P5 is equal to or larger than 10 ms (milliseconds) and equal to or smaller than 1.0 s (second). Therefore, it is easy to sufficiently increase the heat load applied to the first electrode 92 in the fifth period P5. It is easier to maintain the shape of the protrusion 552p.

According to this embodiment, the length t4 of the fourth period P4 is equal to or larger than length of six cycles and equal to or smaller than length of thirty cycles of an alternating current having the second frequency f2 supplied to the discharge lamp 90 in the fourth period P4. Therefore, it is possible to suitably adjust the shape of the protrusion 552p of the first electrode 92 in the fourth period P4.

Note that, in this embodiment, it is also possible to adopt configurations and methods explained below.

In this embodiment, the first period P1, the second period P2, the fourth period P4, and the fifth period P5 may be provided in any way within the range in which the mixed period PH1 is provided. For example, in the above explanation, the first period P1 and the second period P2 are alternately continuously provided in the mixed period PH1. However, the invention is not limited to this. The first period P1 and the second period P2 may be provided separately from each other. For example, the second period P2 and the fourth period P4, the second period P2 and the fifth period P5, and the fourth period P4 and the fifth period P5 may be respectively provided continuously.

In this embodiment, the fourth period P4 and the fifth period P5 provided between the mixed periods PH1 temporally adjacent to each other may be provided immediately after the second period P2.

In the above explanation, the end polarity in the certain period and the start polarity in the period provided immediately after the certain period are different from each other. However, the invention is not limited to this. In this embodiment, the end polarity in the certain period and the start polarity in the period provided immediately after the certain period may be the same.

In this embodiment, the control section 40 may set the total length of the third DC periods P51 in the fifth period P5 on the basis of only the lamp voltage Vla or may set the total length of the third DC periods P51 in the fifth period P5 on the basis of only the driving power Wd. In this embodiment, the total length of the third DC periods P51 in the fifth period P5 does not have to change.

In this embodiment, the control section 40 may set the length t4 of the fourth period P4 on the basis of at least one of the lamp voltage Vla and the driving power Wd in the same manner as setting the total length of the third DC periods P51 in the fifth period P5 and the length t2 of the second period P2. That is, in this embodiment, the control section 40 may change the length t4 of the fourth period P4 on the basis of at least one of the lamp voltage Vla and the driving power Wd.

In this embodiment, the mixed period PH2 in the third embodiment may be used instead of the mixed period PH1. In this case, the total length of the third DC periods P51 in the fifth period P5 is larger than the total length of the first DC periods P31 in the third period P3 of the mixed period PH2.

In this embodiment, the control section 40 does not have to invert the start polarity in the fourth period P4 every time the fourth period P4 is provided. That is, in this embodiment, the fourth period P4 in which the alternating current having the second frequency f2, the start polarity of which is the same polarity, is supplied to the discharge lamp 90 may be continuously provided twice or more.

In this embodiment, the control section 40 does not have to invert, every time the fifth period P5 is provided, the polarity of the direct current supplied to the discharge lamp 90 in the third DC period P51 and the polarity of the direct current supplied to the discharge lamp 90 in the fourth DC period P52. That is, in this embodiment, the fifth period P5 in which the polarity of the direct current supplied to the discharge lamp 90 in the third DC period P51 and the polarity of the direct current supplied to the discharge lamp 90 in the fourth DC period P52 are the same may be continuously provided twice or more.

Note that, the third embodiment and the fourth embodiment explained above can be combined with both of the first embodiment and the second embodiment.

Note that, in the embodiments, the example is explained in which the invention is applied to the transmission type projector. However, the invention can also be applied to a reflection type projector. The "transmission type" means that a liquid crystal light valve including a liquid crystal panel is a light-transmitting type. The "reflection type" means that the liquid crystal light valve is a light-reflecting type. Note that the light modulating device is not limited to the liquid crystal panel and the like and may be, for example, a light modulating device including a micro-mirror.

In the embodiments, the example of the projector 500 including the three liquid crystal panels 560R, 560; and 560B (liquid crystal light valves 330R, 330G, and 330B) is explained. However, the invention can also be applied to a projector including only one liquid crystal panel and a projector including four or more liquid crystal panels. The configurations of the first to fourth embodiments explained above can be combined as appropriate as long as the configurations are not contradictory to one another.

The entire disclosure of Japanese Patent Application No.: 2015-113728, filed Jun. 4, 2015 and 2015-113729, filed Jun. 4, 2015 are expressly incorporated by reference herein.

What is claimed is:

1. A discharge lamp driving device comprising:
a discharge lamp driving section configured to supply a driving current to a discharge lamp including electrodes; and
a control section configured to control the discharge lamp driving section, wherein
the control section controls the discharge lamp driving section such that a mixed period is provided in which a first period in which an alternating current is supplied to the discharge lamp and a second period in which a direct current is supplied to the discharge lamp are alternately repeated,
the first period includes a plurality of AC periods including a first AC period and a second AC period,
a frequency of alternating current supplied in the first AC period and a frequency of alternating current supplied in the second AC period are different from one another, and
the control section changes a total length of time of the plurality of the AC periods included in the first period.

2. The discharge lamp driving device according to claim 1, wherein the control section repeats the total length of time change in multiple instances of the first period.

3. A projector comprising:
a discharge lamp configured to emit light;
the discharge lamp driving device according to claim 2;

a light modulating device configured to modulate light emitted from the discharge lamp according to an image signal; and a projection optical system configured to project the light modulated by the light modulating device.

4. The discharge lamp driving device according to claim 1, wherein
the control section changes lengths of time of each of the plurality of AC periods included in the first period.

5. A projector comprising:
a discharge lamp configured to emit light;
the discharge lamp driving device according to claim 4;
a light modulating device configured to modulate light emitted from the discharge lamp according to an image signal; and
a projection optical system configured to project the light modulated by the light modulating device.

6. The discharge lamp driving device according to claim 1, further comprising:
a voltage detecting section configured to detect an inter-electrode voltage of the discharge lamp, wherein
the control section sets the frequency of alternating current supplied in the first AC period based on the detected inter-electrode voltage, and
the frequency of alternating current supplied in the first AC period is set higher as the inter-electrode voltage is higher.

7. The discharge lamp driving device according to claim 1, wherein
the control section sets the frequency of alternating current supplied in the first AC period based on driving power supplied to the discharge lamp, and
the frequency of alternating current supplied in the first AC period is set higher as the driving power is smaller.

8. The discharge lamp driving device according to claim 1, wherein
the second AC period occurs after the first AC period, and
the frequency of alternating current supplied in the second AC period is lower than the frequency of alternating current supplied in the first AC period.

9. The discharge lamp driving device according to claim 1, further comprising:
a voltage detecting section configured to detect an inter-electrode voltage of the discharge lamp, wherein
the control section cyclically changes the total length of time and changes a cycle of the change in the total length of time based on at least one of the detected inter-electrode voltage and driving power supplied to the discharge lamp.

10. The discharge lamp driving device according to claim 9, wherein, when the detected inter-electrode voltage is higher than a first voltage, the control section sets the cycle shorter as the detected inter-electrode voltage is higher.

11. The discharge lamp driving device according to claim 10, wherein, when the detected inter-electrode voltage is higher than a second voltage higher than the first voltage, the control section sets the cycle longer as the detected inter-electrode voltage is higher.

12. The discharge lamp driving device according to claim 10, wherein, when the detected inter-electrode voltage is equal to or lower than the first voltage, the control section maintains the cycle fixed.

13. The discharge lamp driving device according to claim 9, wherein, when the driving power is larger than a first driving power, the control section sets the cycle longer as the driving power is larger.

14. The discharge lamp driving device according to claim 13, wherein, when the driving power is equal to or smaller than the first driving power, the control section maintains the cycle fixed.

15. The discharge lamp driving device according to claim 9, wherein the control section cyclically repeats the total length of time change in multiple instances of the first period.

16. The discharge lamp driving device according to claim 9, wherein
the control section cyclically changes lengths of time of each of the plurality of AC periods included in the first period.

17. A projector comprising:
a discharge lamp configured to emit light;
the discharge lamp driving device according to claim 9;
a light modulating device configured to modulate light emitted from the discharge lamp according to an image signal; and
a projection optical system configured to project the light modulated by the light modulating device.

18. A projector comprising:
a discharge lamp configured to emit light;
the discharge lamp driving device according to claim 1;
a light modulating device configured to modulate light emitted from the discharge lamp according to an image signal; and
a projection optical system configured to project the light modulated by the light modulating device.

19. The discharge lamp driving device of claim 1, wherein the mixed period is provided while supplying a single lamp power.

20. The discharge lamp driving device of claim 1, wherein the mixed period is started with the first period.

21. A discharge lamp driving method for supplying a driving current to a discharge lamp including electrodes and driving the discharge lamp, the method comprising:
supplying, to the discharge lamp, the driving current including a mixed period in which a first period in which an alternating current is supplied to the discharge lamp and a second period in which a direct current is supplied to the discharge lamp are alternately repeated, the first period including a plurality of AC periods including a first AC period and a second AC period, a frequency of alternating current supplied in the first AC period and a frequency of alternating current supplied in the second AC period being different from one another; and
changing a total length of time of the plurality of the AC periods included in the first period.

22. The discharge lamp driving method according to claim 21, further comprising:
cyclically changing the total length of time; and
changing a cycle of the change in the total length of time.

* * * * *